(12) United States Patent
Goellner

(10) Patent No.: US 8,695,465 B2
(45) Date of Patent: Apr. 15, 2014

(54) SAW BLADE STABILIZER AND METHOD

(75) Inventor: Willy Goellner, Rockford, IL (US)

(73) Assignee: Advanced Machine & Engineering Co., Rockford, IL (US)

( * ) Notice: Subject to any disclaimer, the term of this patent is extended or adjusted under 35 U.S.C. 154(b) by 613 days.

(21) Appl. No.: 12/858,612

(22) Filed: Aug. 18, 2010

(65) Prior Publication Data

US 2012/0042756 A1 Feb. 23, 2012

(51) Int. Cl.
*B27B 5/00* (2006.01)
*B27B 5/18* (2006.01)
*B27B 27/06* (2006.01)
*B27B 17/00* (2006.01)
*B27B 11/02* (2006.01)
*B23D 45/02* (2006.01)
*B23D 47/02* (2006.01)

(52) U.S. Cl.
CPC .............. *B23D 45/021* (2013.01); *B23D 47/02* (2013.01)
USPC ................................. 83/13; 83/471.1; 83/824

(58) Field of Classification Search
CPC .. B23D 45/105; B23D 55/005; B23D 45/021; B23D 47/02; B27B 5/187; B27B 7/00; B27B 9/04; B27G 19/02; B26D 7/025; B26D 7/0006; B23Q 11/0092; B21C 37/20
USPC ......... 83/820–821, 824, 827–829, 471.2, 169
See application file for complete search history.

(56) References Cited

U.S. PATENT DOCUMENTS

| | | | |
|---|---|---|---|
| 1,840,731 A * | 1/1932 | Mathews et al. | 83/823 |
| 3,483,858 A | 12/1969 | Jansen | |
| 3,540,334 A | 11/1970 | McLauchlan | |
| 3,623,520 A * | 11/1971 | Neild | 83/169 |
| 3,643,536 A * | 2/1972 | Alexander | 83/820 |
| 3,656,393 A | 4/1972 | Goellner | |
| 3,674,065 A * | 7/1972 | Fairfield et al. | 83/13 |
| 3,703,915 A * | 11/1972 | Pearson | 83/824 |
| 3,772,956 A * | 11/1973 | McMillan | 83/827 |
| 3,797,354 A * | 3/1974 | Allison | 83/824 |
| 3,812,951 A * | 5/1974 | Fullaway | 198/458 |
| 3,937,114 A * | 2/1976 | Joensson et al. | 83/425.2 |
| 4,033,319 A * | 7/1977 | Winter | 125/13.01 |
| 4,090,540 A * | 5/1978 | Smith et al. | 144/34.1 |

(Continued)

FOREIGN PATENT DOCUMENTS

EP 16688 A1 * 10/1980
WO WO 87/05556 A1 9/1987

*Primary Examiner* — Ghassem Alie
*Assistant Examiner* — Bharat C Patel
(74) *Attorney, Agent, or Firm* — Reinhart Boerner Van Deuren P.C.

(57) ABSTRACT

Stabilization of a circular saw blade is provided, through use of a blade stabilizer mounted adjacent a workpiece in a fixed relationship to the workpiece and having a stabilizer contact element adapted to bear against the circular saw blade and exert a force against the saw blade in a direction substantially perpendicular to a cutting plane of the saw blade at a point on at least one of the blade faces on the working side of the blade, proximate an axis of motion passing through an axis of rotation of the saw blade and the workpiece in the cutting plane, as the circular saw blade and/or the workpiece move relative to one another along the axis of motion. The axis of motion may be linear or curved. Some embodiments include additional blade stabilizers.

21 Claims, 16 Drawing Sheets

(56) References Cited

U.S. PATENT DOCUMENTS

| | | | |
|---|---|---|---|
| 4,136,590 A * | 1/1979 | Kordyban et al. | 83/169 |
| 4,323,145 A * | 4/1982 | Allen | 267/122 |
| 4,364,311 A * | 12/1982 | Platt, III | 100/6 |
| 4,463,645 A | 8/1984 | Goellner | |
| 4,468,993 A * | 9/1984 | McCown et al. | 83/112 |
| 4,563,928 A | 1/1986 | Salomonsson | |
| 4,662,259 A * | 5/1987 | Dutina | 83/821 |
| 4,679,475 A * | 7/1987 | Antezana | 83/420 |
| 4,977,802 A * | 12/1990 | Kirbach | 83/13 |
| 5,036,738 A * | 8/1991 | May | 83/102.1 |
| 5,074,179 A * | 12/1991 | Omi | 83/478 |
| 5,213,020 A | 5/1993 | Pleau et al. | |
| 5,398,578 A * | 3/1995 | Andersen | 83/829 |
| 5,497,684 A * | 3/1996 | Martin | 83/13 |
| 6,128,994 A * | 10/2000 | Phelps | 83/471.2 |
| 7,127,978 B2 * | 10/2006 | Boss et al. | 83/821 |
| 7,241,211 B2 | 7/2007 | Baratta | |
| 2005/0011328 A1 * | 1/2005 | McGehee et al. | 83/523 |
| 2006/0174497 A1 | 8/2006 | Belfiglio | |
| 2007/0266833 A1 | 11/2007 | Radziszewski et al. | |

* cited by examiner

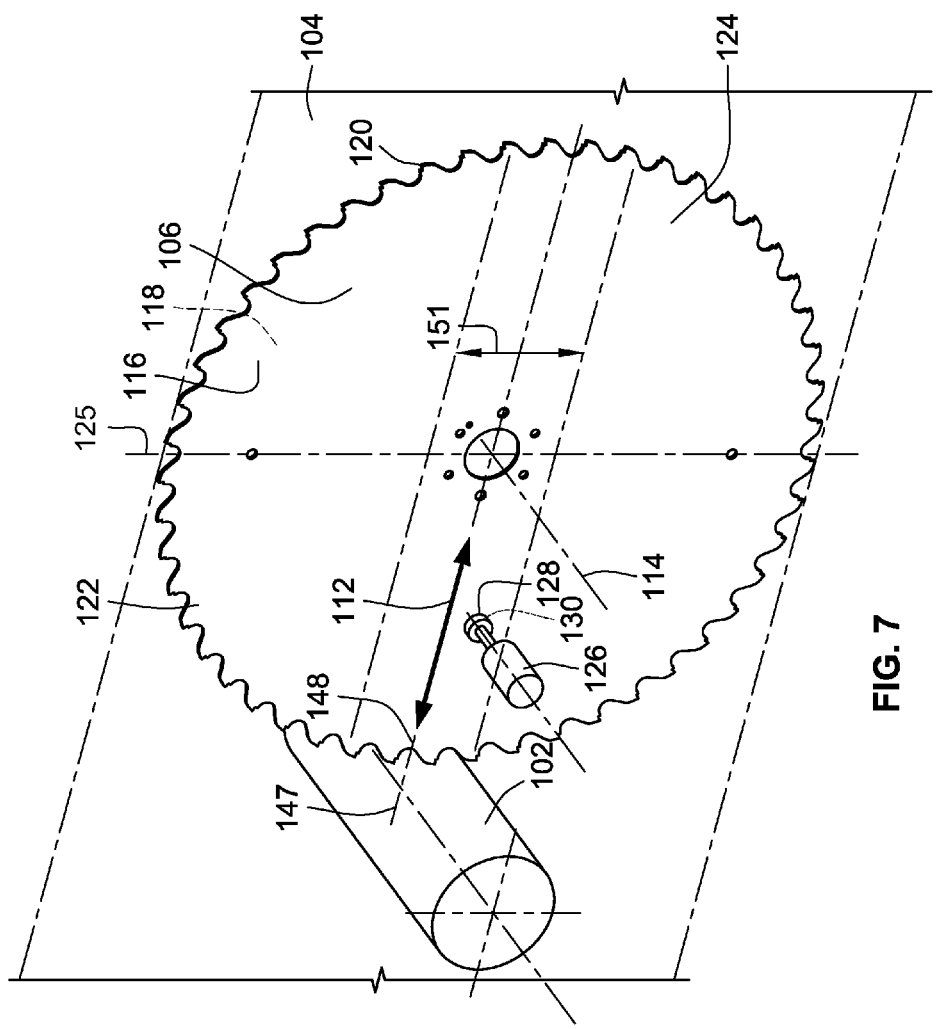

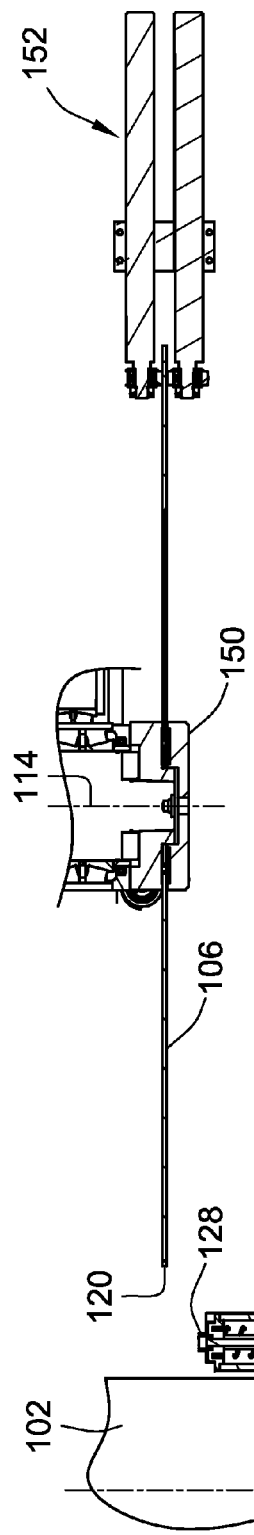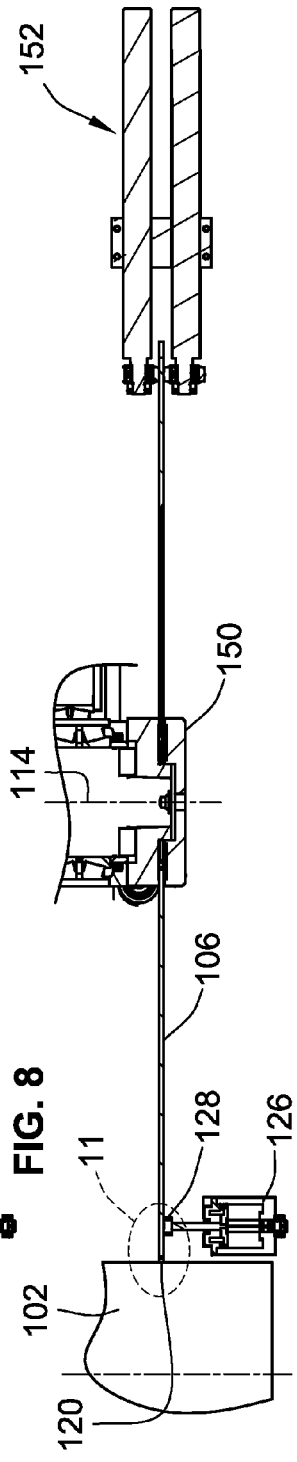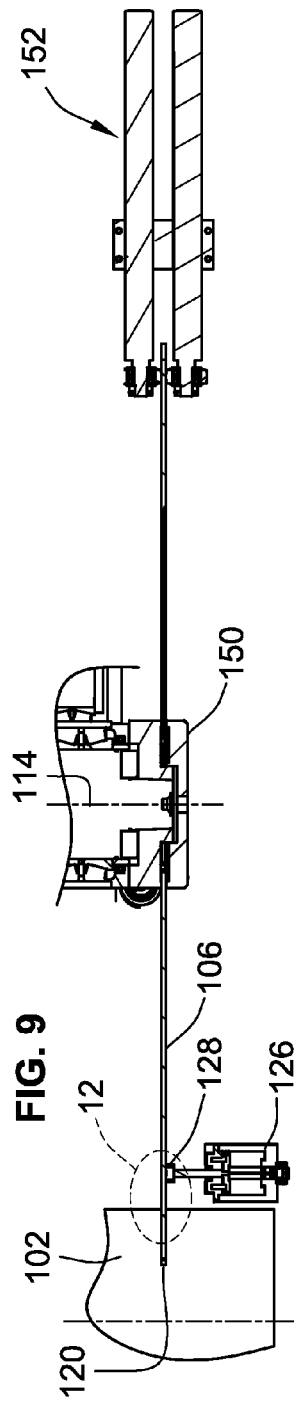

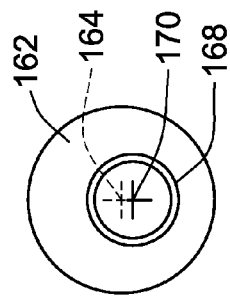
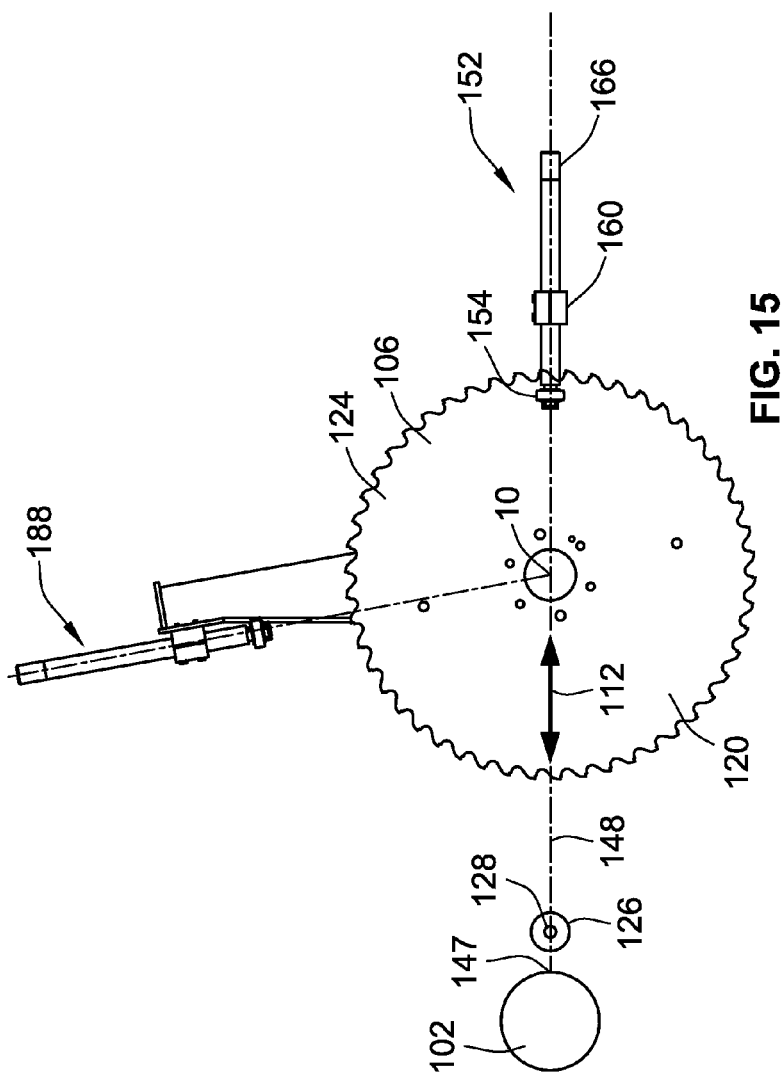
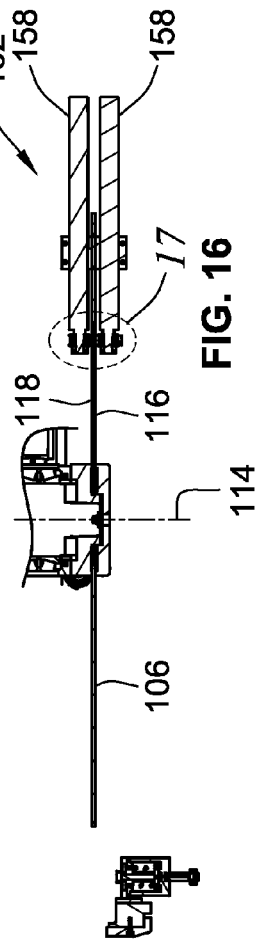

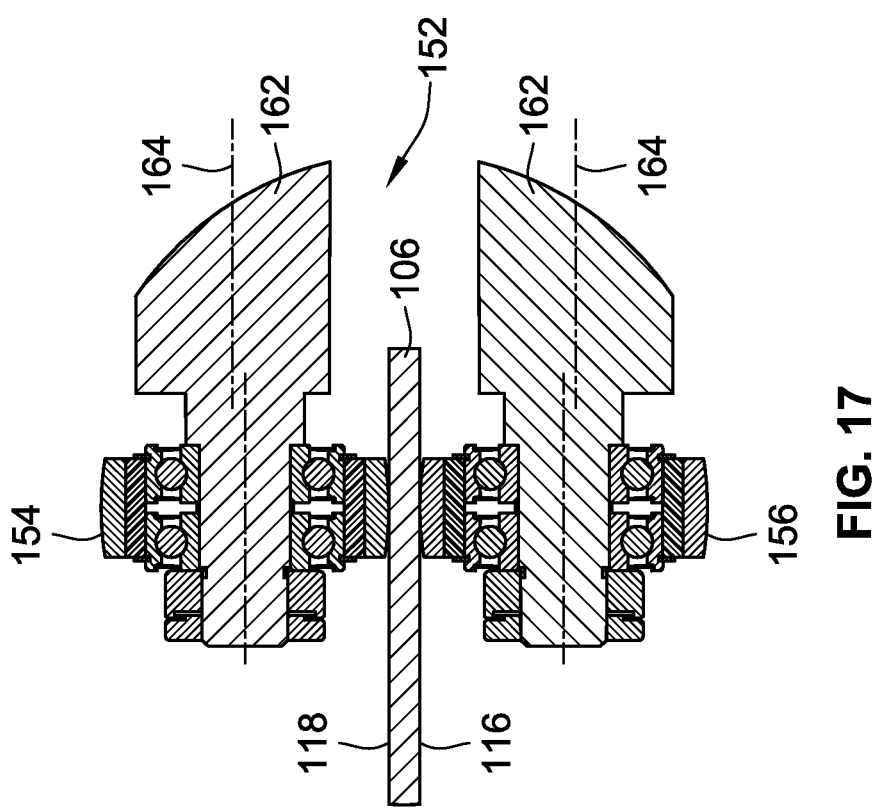

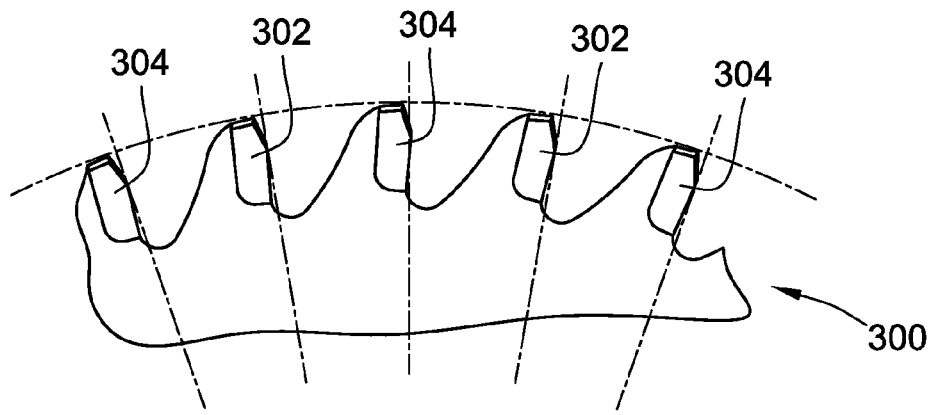
FIG. 25
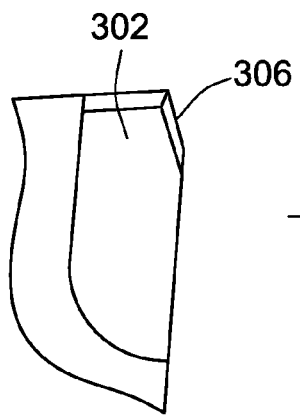
FIG. 26
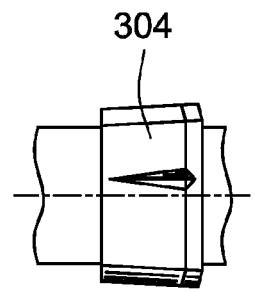
FIG. 27     FIG. 29
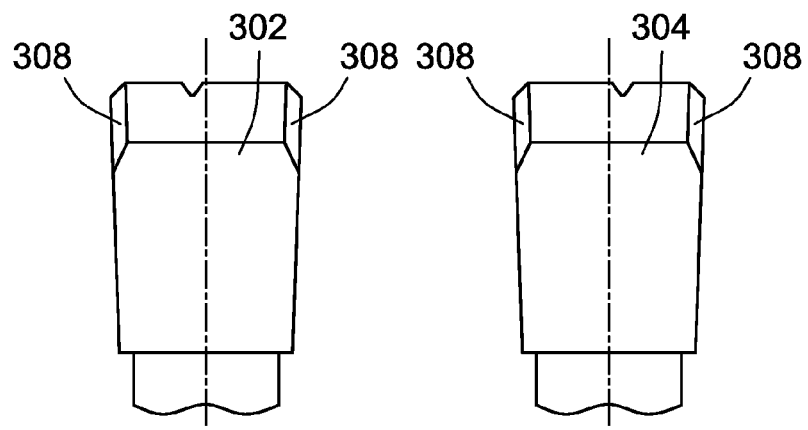
FIG. 28     FIG. 30

SAW BLADE STABILIZER AND METHOD

FIELD OF THE INVENTION

This invention relates to stabilization of circular saw blades, and more particularly to the stabilization of large circular saw blades of the type used in cut-off sawing operations for workpieces made of metal.

BACKGROUND OF THE INVENTION

Over a period of more than three decades, the Assignee of the present invention has demonstrated that its cut-off sawing systems using circular saw blades consistently out perform band saws and other cutting systems for cutting railroad rails, forging, billets and other workpieces made of metal. Specifically, equipment manufactured by the common Assignee of the present invention has utilized saw blades approaching six feet in diameter to cut workpieces of up to 24 inches in height and/or width at speeds 10 times faster than systems utilizing band saws. Use of the Assignee's circular cut-off saw systems has also repeatedly demonstrated an ability to cut more precisely, economically and reliably than other types of cut-off systems.

In order to achieve a high level of precision in cut-off length, and a smooth finish on the cut-off surface of the finished workpiece, using a circular saw blade, it is necessary to deal with a number of factors affecting the path of the saw blade as it enters and passes through the workpiece during the sawing operation. For example, the saw blade needs to be precisely constructed from suitable materials which will minimize dimensional inaccuracies of the blade itself, both at rest and while exposed to the working loads and heat generated during the cut-off process. The blade must also be accurately and securely mounted on a driving spindle in a manner which reduces wobble and run-out of the cutting edge. The configuration of the cutting teeth on the cutting edge of the saw blade can also influence on how true the blade will run and the nature of vibration introduced into the blade during the cutting operation. Such circular saw blades are also inherently distorted by vibration modes induced in the circular disk of the blade by the action of the teeth on the cutting edge impacting on and slicing through the workpiece.

Through the years, the Assignee and others involved in utilizing circular saw blades for cutting wood, metals and other materials have disclosed a variety of apparatuses and methods for dealing with the various factors influencing the performance of a circular saw blade. For example, commonly assigned U.S. Pat. No. 3,656,393 to Goellner discloses a method and apparatus for driving a saw blade and positively locking the saw blade to the nose of a driving spindle in a manner which minimizes backlash between the blade and spindle. Commonly assigned U.S. Pat. No. 4,463,645 to Goellner discloses a circular saw blade having a dual chip-cutting action in which all of the saw teeth are of like width and radial height to improve cutting action of the blade in a variety of respects, including significantly changing the manner in which the cutting teeth impact upon and cut through a workpiece in a way which positively influences deformation of the blade disk as a result of vibration induced by the cutting action of the saw teeth through the workpiece.

FIGS. 1-3 are schematic illustrations of a number of vibration modes for a center-clamped circular plate, such as a circular saw blade. Specifically, FIG. 1 is a chart tabulating a number of different vibration patterns which may be encountered in the center-clamped circular plate when excited at different natural frequencies. The solid straight lines and circles in the illustrations of FIG. 1 represent nodes, or areas where the displacement of the disk is essentially zero. The plus (+) and minus (−) markings on the illustrations in FIG. 1 show displacement of the disk out of or into the plane of the paper for the disk in each of the vibration modes illustrated in FIG. 1.

Those skilled in the art have long recognized that, for purposes of stabilizing a circular saw blade, it is the first mode of vibration as illustrated in FIG. 2 which is the most important mode to address. In the first mode of vibration, the disk A is essentially bisected by a single diametrically extending node B, with the hemispheres C, D of the disk A on either side of the node B cyclically deflecting in opposite directions from one another, as shown in FIG. 3, when the disk A is excited at the first natural frequency.

Through the years, a number of prior approaches have been disclosed for stabilizing a circular saw blade by placing matching pairs of stabilizers on opposite sides of the saw blade. The following US patent documents illustrate a number of prior approaches to stabilizing a circular saw blade, by placing pairs of stabilizer pads or other devices on opposite sides of the saw blade, with those pairs of pads being placed in some disclosures along a desired node line for the saw blade: U.S. Pat. No. 3,483,858 to Jansen; U.S. Pat. No. 4,136,590 to Kordyban; U.S. Pat. No. 4,563,928 to Salomonsson; U.S. Pat. No. 5,213,020 to Pleau; U.S. Pat. No. 7,127,978 to Boss; and US Published Patent Application 2006/0174497 to Belfiglio.

In general, these previous approaches to stabilizing a saw blade are directed toward circular saw blades used in rip-sawing arrangements. In rip-sawing, the conditions acting on the saw blade are different than for a typical cross-cutting arrangement. For example, in a rip-sawing arrangement, the workpiece along a longitudinal axis of the workpiece is typically mounted in some sort of movable carriage arrangement which directs the workpiece over, and pushes the workpiece past the saw blade, with the saw blade being mounted on a stationery cradle or frame arrangement. In cross-cutting arrangements, it is typically preferred to have the workpiece be mounted in a stationery cradle and have the saw blade mounted in a moveable carriage which can be manipulated to direct the saw blade across the longitudinal axis of the workpiece along an axis of motion in a cutting plane.

In a rip-sawing arrangement, providing stabilization for a saw blade is more readily accomplished, because the stabilizers can be mounted in a fixed location with respect to the circular saw blade. For cross-cutting saw operations, having the stabilizing elements in a fixed position with relation to the saw blade, at a location providing effective and efficient blade stabilization, has heretofore presented significant design difficulties, partly caused by having the blade move across the workpiece, as opposed to having the workpiece move across the blade.

What is needed, therefore, is an improved method and apparatus for stabilizing a circular saw blade, and particularly such an improved method and apparatus which is effective in a cross-cutting arrangement.

BRIEF SUMMARY OF THE INVENTION

This invention provides improved stabilization of a circular saw blade through use of a blade stabilizer mounted adjacent a workpiece in a fixed relationship to the workpiece and having a stabilizer contact element adapted to bear against the circular saw blade and exert a force against the saw blade in a direction substantially perpendicular to the cutting plane of the saw blade at a point on at least one of the blade faces on the working side of the blade, proximate an axis of motion passing through an axis of rotation of the saw blade and the workpiece in the cutting plane, as the circular saw blade and/or the workpiece move relative to one another along the axis of motion. Some forms of the invention may also utilize additional blade stabilizers, in accordance with various aspects of the invention. The invention may be used in various forms with sawing arrangements and operations having a linear axis of motion, and also with sawing arrangements and operations having a curved axis of motion.

In one form of the invention, an apparatus for stabilizing a circular saw blade is provided. The circular saw blade has a diameter and is mounted for rotation in a cutting plane which is coplanar to a cutting plane. The saw blade is moveable along an axis of motion of the saw blade extending through the axis of rotation within the cutting plane, for cutting a workpiece extending through the cutting plane along a workpiece axis in such a manner that the workpiece axis extends through the cutting plane. The saw blade also defines oppositely-oriented first and second faces thereof which are joined by a cutting edge extending around a periphery of the circular saw blade. The saw blade further defines a working side thereof extending toward the workpiece axis along the axis of motion of the saw blade, and a non-working side of the saw blade extending oppositely from the workpiece axis along the axis of motion of the circular saw blade. The contact element exerts a force against the saw blade in a direction substantially perpendicular to the cutting plane at a point on at least one side of the blade faces proximate to the axis of motion of the saw blade on the working side of the blade as the axis of rotation of the circular saw blade moves laterally along the axis of motion.

In some forms of the invention, stabilizer contact element is retractable away from the saw blade. Some forms of the invention may also include a control arrangement operatively connected between the stabilizer contact element and the blade, for automatically retracting the stabilizer contact element when the cutting edge enters a predetermined zone of proximity to the stabilizer contact element, to thereby preclude contact between the cutting edge and the stabilizer contact element. A control arrangement, according to the invention, may also perform other functions such as: regulating the force exerted by the stabilizer contact element against the blade. The controller may perform a function including, but not limited to automatically extending and/or retracting the stabilizer contact element, and controlling the force exerted by the stabilizer element as a function of an operating parameter such as a relative position between the blade and the workpiece, a measurement of vibration during a sawing operation, rotational speed of the cutting blade, and/or any other appropriate operating parameter.

Some forms of a first blade stabilizer, according to the invention, include a fluid pressure chamber operatively connected to the stabilizer contact element for urging the stabilizer contact element to move in a direction perpendicular to the saw blade in response to the application of an actuating fluid pressure within the fluid pressure chamber. In some forms of the invention, pressured fluid from the fluid pressure chamber is directed between the stabilizer contact element and the face of the saw blade, when the stabilizer contact element is proximate to the face of the saw blade.

A first blade stabilizer, according to the invention may also include a return spring for urging movement of the stabilizer contact element to a non-actuated position when actuating fluid pressure is not present in the fluid pressure chamber. In forms of the invention having pressurized fluid from the fluid pressure chamber directed between the stabilizer contact element and the face of the saw blade, the stabilizer apparatus may further include a flow restrictor to limit flow of the pressurized fluid directed between the stabilizer contact element and the face of the saw blade.

Some forms of the invention may also include a secondary blade stabilizer mounted opposite the first blade stabilizer substantially along the axis of motion of the saw blade in a fixed relationship to the rotational axis of the saw blade. Such a secondary blade stabilizer may have one or more stabilizer contact elements adapted to bear against the circular saw blade and exert a force against the saw blade in a direction substantially perpendicular to the cutting plane at a point on at least one of the blade faces proximate to the axis of motion of the saw blade on the non-working side of the blade, as the axis of rotation of the saw's blade moves along the axis of motion of the saw blade. The secondary stabilizer contact elements may be retractable away from the saw blade to allow for passage of the cutting edge, in some forms of the invention.

A secondary stabilizer, according to the invention, may include first and second secondary stabilizer contact elements operatively mounted for bearing against first and second faces of the circular saw blade. The first and second secondary stabilizer contact elements may be independently adjustable in a direction substantially perpendicular to the cutting plane, for bringing the first and second secondary stabilizer elements into a bearing relationship against the first and second faces of the circular saw blade respectively.

In some forms of the invention, at least one secondary stabilizer contact element may be eccentrically mounted on a rotatable secondary stabilizer mounting shaft which defines an axis thereof. The secondary stabilizer contact elements are eccentrically mounted in such a manner that rotation of the mounting shaft about its axis urges the secondary stabilizer contact element mounted to that shaft toward the saw blade.

In some forms of the invention, a secondary stabilizer contact element may be a stabilizer roller mounted for rotation about a stabilizer roller axis that is offset from and extends substantially parallel to the secondary stabilizer mounting shaft axis, with the stabilizer roller also having an outer surface thereof adapted for contact with the face of the saw blade.

In some forms of the invention, wherein the circular saw blade is moveable along the axis of motion between a maximum retracted position and a maximum extended position of the circular saw blade with respect to the workpiece axis, the secondary stabilizer contact elements are positioned between the cutting edge and the axis of the circular saw blade regardless of the position of the circular saw blade along the axis of motion.

In some forms of the invention, at least one secondary stabilizer contact element is a stabilizer shoe mounted for pivotable movement about a secondary stabilizer shoe axis that is offset from and extends substantially parallel to the secondary stabilizer mounting shaft axis. The secondary stabilizer shoe may have an outer surface thereof adapted for contact with the face of the saw blade. Such a secondary stabilizer shoe may also be moveable linearly along the axis of the secondary stabilizer mounting shaft, in some forms of the invention. The secondary stabilizer shoe may be mounted for rotation about a stabilizer shoe axis that is offset from and extends substantially parallel to the axis of a secondary stabilizer mounting shaft, so that the contact face of the stabilizer shoe is rotatable about the offset axis. A stabilizer shoe, according to the invention, may also include a friction element, which may take the form of a deformable O-ring, for example, disposed for resisting rotation of the stabilizer shoe to thereby facilitate positioning of the contact face of the stabilizer shoe in relation to the face of the saw blade.

A method for stabilizing a circular saw blade, in accordance with the invention, may include exerting a stabilizing force against the saw blade in a direction substantially perpendicular to the cutting plane at a point on one of the blade faces proximate the axis of motion of the saw blade on the working side of the blade as the axis of rotation of the circular saw blade moves laterally along the axis of motion.

A method, according to the invention, may also include adjusting the stabilizing force exerted against the face of the saw blade to achieve a desired stability condition. A stabilizing force may be exerted against the face of the saw blade with a blade stabilizer mounted adjacent the workpiece axis in a fixed relationship to the workpiece axis and having a stabilizer contact element adapted to bear against the circular saw blade. The stabilizer contact element may be retracted away from the saw blade to allow for passage of the cutting edge.

A method, according to the invention, may include exerting a secondary stabilizing force against the saw blade in a direction substantially perpendicular to the cutting plane at a point on at least one of the blade faces proximate to the axis of motion of the saw blade on the non-working side of the blade, as the axis of rotation of the circular saw blade moves along the axis of motion. The secondary stabilizing force exerted against the saw blade may be adjusted to achieve a desired stability condition. The secondary stabilizer contact force may be directed against the face of the blade at a fixed location with respect to the saw blade rotational axis as the circular saw blade rotational axis moves along the axis of motion. The fixed location for applying the secondary forces may be adjusted to achieve a desired stability condition.

In some forms of the invention, secondary stabilizing forces may be oppositely directed on both blade faces proximate the axis of motion of the saw blade on the non-working side of the blade as the axis of rotation of the circular saw blade moves along the axis of motion. The oppositely-directed secondary stabilizing forces may be substantially coaxial with one another.

The invention may also include exerting a stabilizing force against saw blade in a direction substantially perpendicular to the cutting plane at a point on one of the blade faces proximate the axis of motion of the saw blade on the working side of the blade as the axis of rotation of the circular saw blade moves laterally along the axis of rotation.

In some forms of the invention, the workpiece and stabilizer are fixed in relative position to one another, and the axis of rotation of the circular saw blade moves along the axis of motion through a cutting plane intersecting the workpiece. In other embodiments of the invention, the axis of rotation of the circular saw blade is fixed, and the workpiece and first blade stabilizer are fixed in relationship to one another, but moveable along the axis of motion to thereby move the workpiece axis through the circular saw blade while the circular saw blade is rotating within the cutting plane.

The invention may also take the form of a sawing apparatus for cutting a workpiece along a cutting plane using a circular saw blade stabilized by a stabilizer according to the invention. Such an apparatus may include a circular saw blade arrangement and a workpiece support arrangement operatively connected for movement relative to one another along an axis of motion within the cutting plane.

A circular saw blade arrangement, according to the invention, may include the circular saw blade mounted for rotation in the cutting plane about an axis of rotation. The circular saw blade defines oppositely oriented first and second faces thereof joined by a cutting edge extending around the periphery of the circular saw blade. The saw blade further defines a working side of the circular saw blade for cutting through the workpiece and a non-working side of the circular saw blade extending oppositely from the working side of the circular saw blade.

A workpiece support arrangement, according to the invention, may be operatively configured for supporting a workpiece therein with the workpiece oriented to extend through the cutting plane. The workpiece support arrangement includes a blade stabilizer having a stabilizer contact element adapted to bear against the circular saw blade and exert a force against at least one of the faces of the circular saw blade. The stabilizer contact element is further adapted when positioned such that the force exerted by the stabilizer contact element is directed substantially perpendicular to the cutting plane at a point of contact proximate the axis of motion on the working side of the blade, as the circular saw blade arrangement and workpiece support arrangement move relative to one another along the axis of motion.

The invention may also take the form of a blade stabilizer apparatus, according to the invention, for cutting a workpiece along a cutting plane with a circular saw blade, when the workpiece is supported in a workpiece support arrangement and the circular saw blade is mounted in a circular saw blade arrangement. The circular saw blade is mounted for rotation in the cutting plane about an axis of rotation. The circular saw blade defines oppositely oriented first and second faces thereof joined by a cutting edge extending around the periphery of the circular saw blade. The saw blade further defines a working side of the circular saw blade for cutting through the workpiece and a non-working side of the circular saw blade extending oppositely from the working side of the circular saw blade. The circular saw blade arrangement and workpiece support arrangement are operatively connected for movement relative to one another along an axis of motion within the cutting plane. The blade stabilizer apparatus may include a stabilizer body and a stabilizer contact element. The stabilizer body is configured for affixed attachment to the workpiece support arrangement. The stabilizer contact element is operatively attached to the stabilizer body and adapted to bear against the circular saw blade and exert a force against at least one of the faces of the circular saw blade in a direction substantially perpendicular to the cutting plane, at a point of contact proximate to the axis of motion on the working side of the blade, as the circular saw blade arrangement and workpiece support arrangement move relative to one another along the axis of motion.

In some forms of the invention, a first blade stabilizer is mounted adjacent the workpiece axis in a fixed relationship to the workpiece axis, and has a stabilizer contact element adapted to bear against the circular saw blade.

Other aspects, objects and advantages of the invention will be apparent from the following detailed description and accompanying drawings of exemplary embodiments.

BRIEF DESCRIPTION OF THE DRAWINGS

The drawings in conjunction with the written text herein describe exemplary embodiments and various aspects of the present invention. In the drawings:

FIG. 7 is a perspective illustration of several elements of the first exemplary embodiment of the sawing apparatus of FIGS. 4-6, showing their relationship to a workpiece and a cutting plane;

FIGS. 8-10 are schematic illustrations showing a top view of a circular saw blade, a first blade stabilizer and a secondary blade stabilizer, according to the invention, with FIGS. 8-10 sequentially illustrating the relative position and operation of the depicted components as the saw blade moves toward, into contact with, and through the workpiece;

FIGS. 15 and 16 are a side view and a top view, respectively, of various components of the first exemplary embodiment of the sawing apparatus of FIG. 1, illustrating features and relationships of the various components, including a secondary blade stabilizer arrangement;

FIG. 17 is an enlarged sectional illustration of a portion of the secondary blade stabilizer of FIGS. 1, 15 and 16 taken from an area indicated by dashed lines in FIGS. 9 and 16;

FIG. 18 is an end view of a portion of a secondary stabilizer mounting shaft of the secondary stabilizer shown in FIG. 17.

FIGS. 25-30 are illustrations of a circular saw blade having a dual chip cutting action which may be used with efficacy in practicing the present invention.

While the invention is described herein in connection with certain preferred embodiments, there is no intent to limit the scope of the invention to those embodiments. On the contrary, the intent is to cover all alternatives, modifications and equivalents as included within the spirit and scope of the invention.

DETAILED DESCRIPTION OF THE INVENTION

Figure 4:
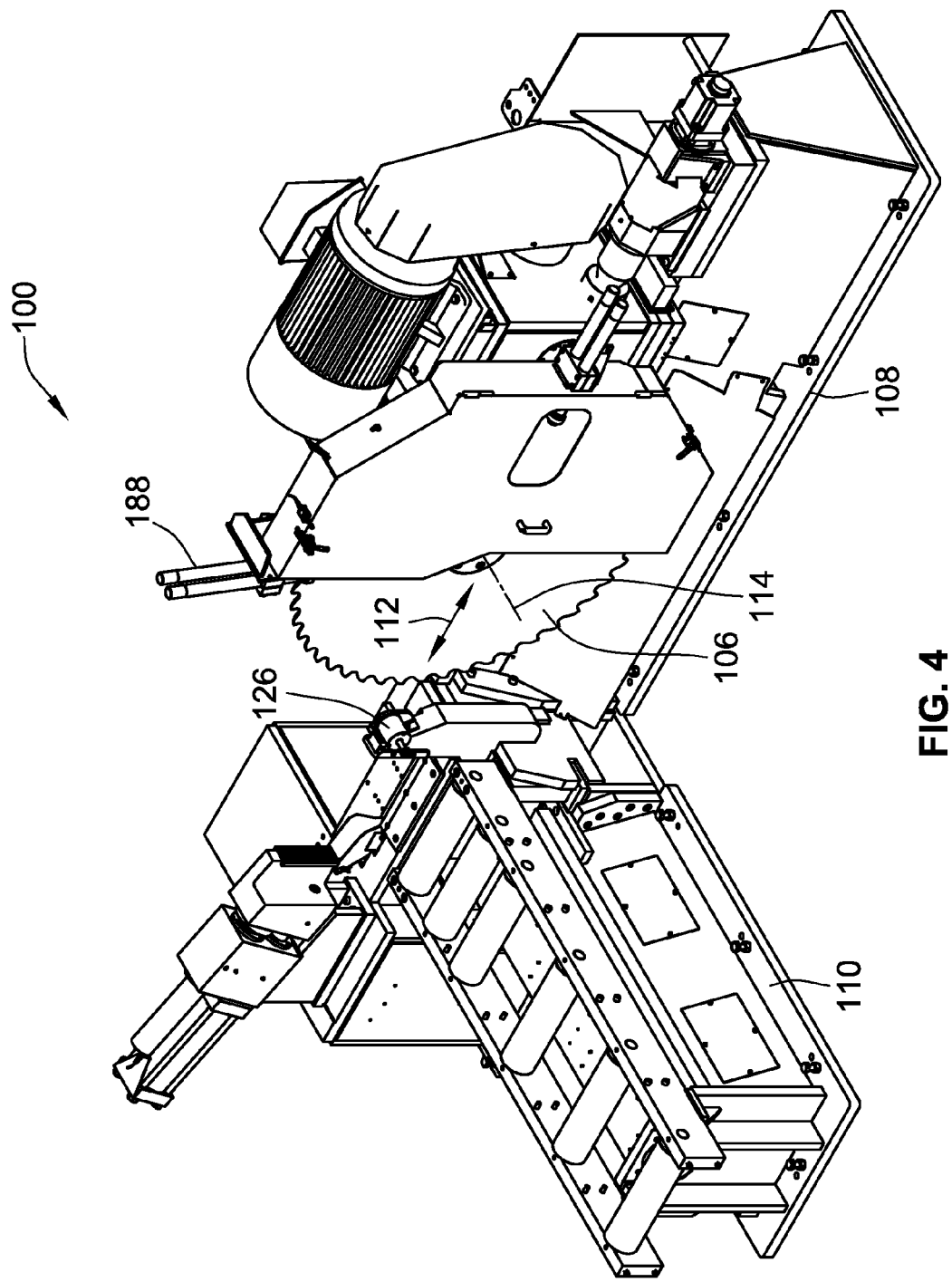
FIG. 4 is a perspective illustration of a first exemplary embodiment of a sawing apparatus, according to the invention.
Figure 5:
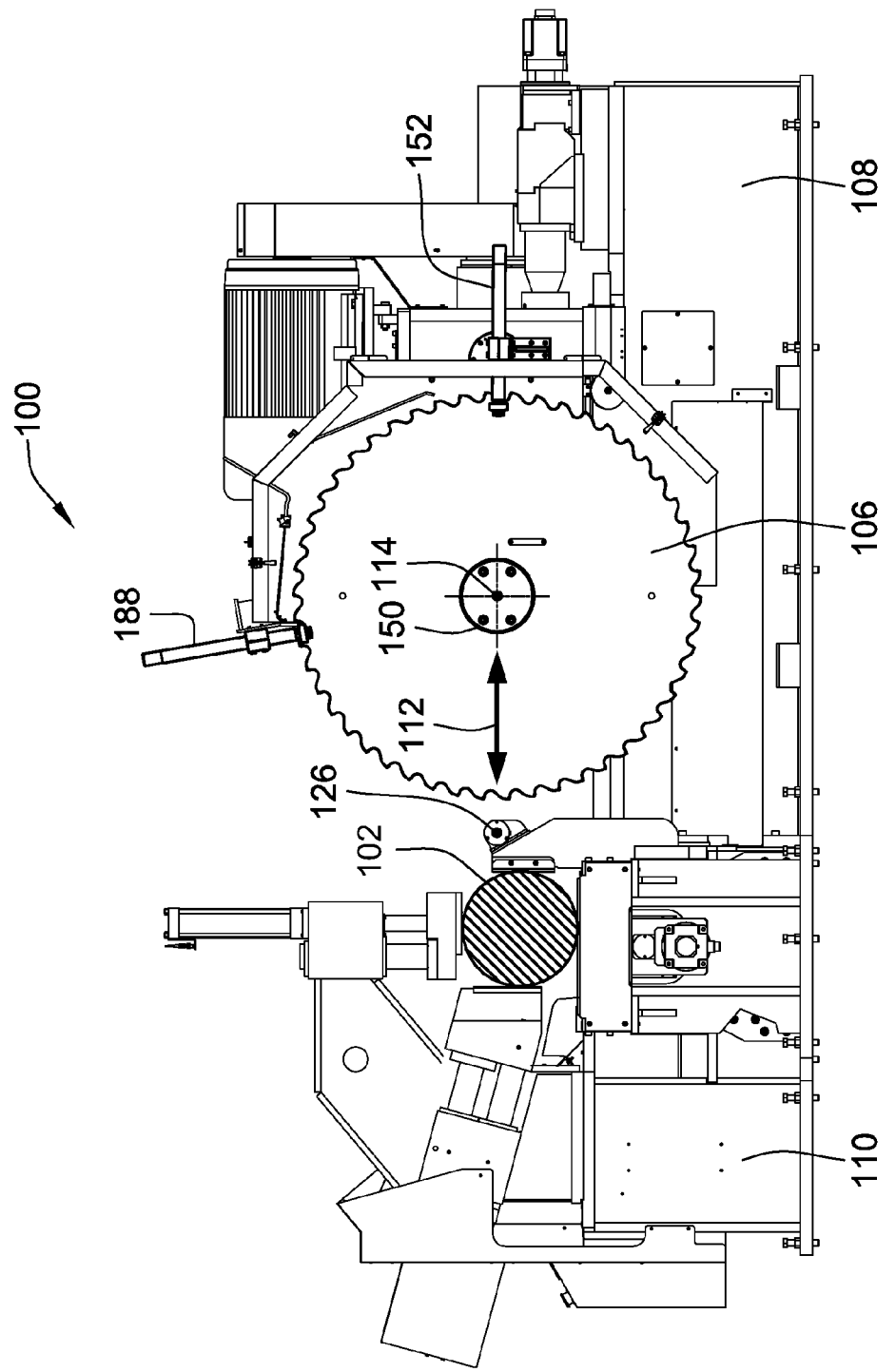
FIGS. 5 and 6 are a side and top view, respectively, of the first exemplary embodiment of the sawing apparatus of FIG. 1.
Figure 6:
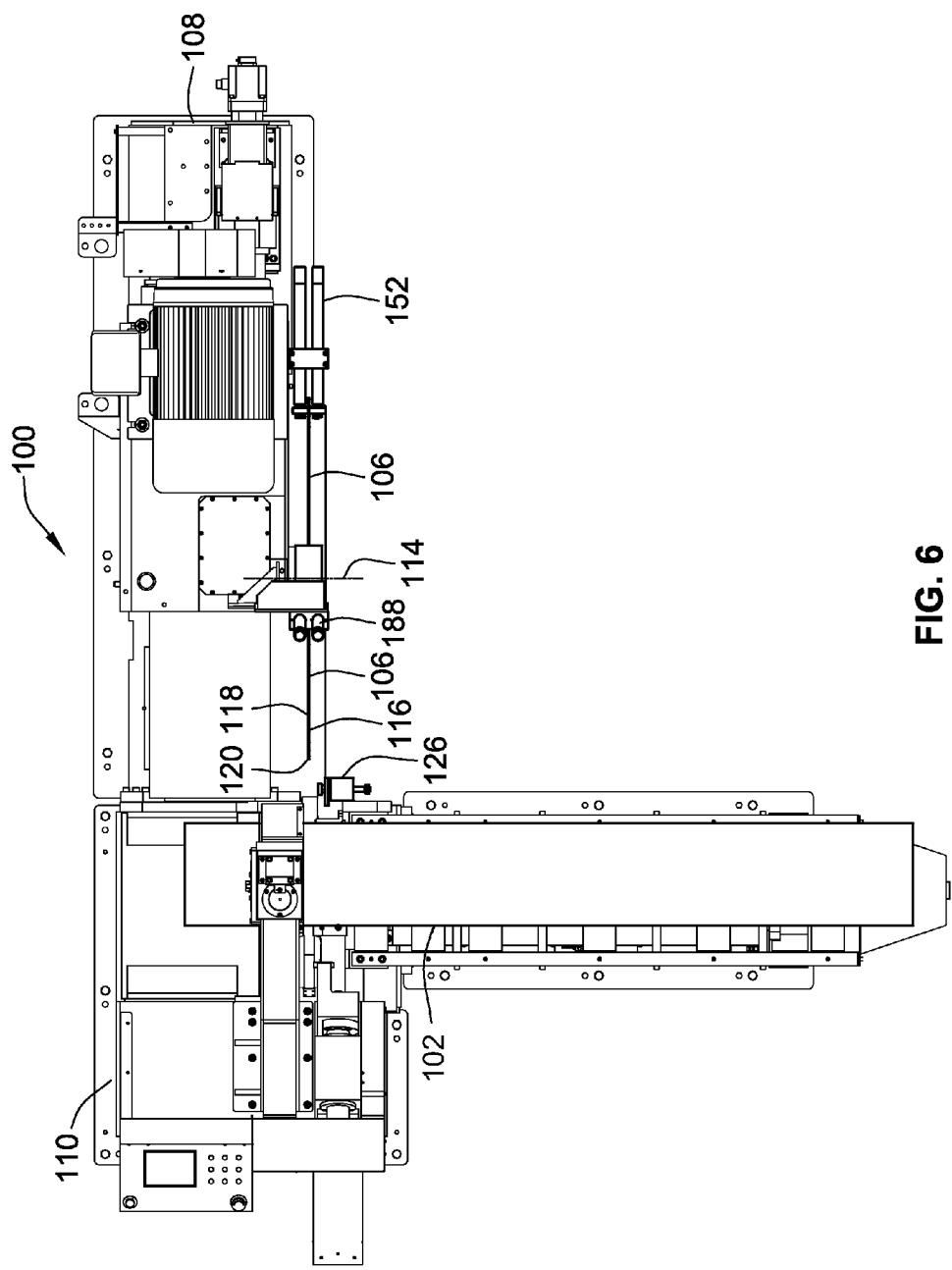

FIGS. 4-6 show a first exemplary embodiment of a sawing apparatus 100 for cutting a workpiece 102 along a cutting plane 104 with a circular saw blade 106, in the manner indicated schematically in FIG. 7.

As shown in FIGS. 4-7, the first exemplary embodiment of the invention in the form of the sawing apparatus 100 includes a circular saw blade arrangement 108 and a workpiece support arrangement 110. The circular saw blade arrangement 108 and workpiece support arrangement 110 are operatively connected to one another for movement relative to one another along an axis of motion 112 within the cutting plane 104, as illustrated by the double-ended arrow 112 as shown in FIGS. 4, 5 and 7, and described in greater detail below.

The circular saw blade arrangement 108 includes the circular saw blade 106 mounted for rotation in the cutting plane 104 about an axis of rotation 114 of the circular saw blade 106. As shown in FIGS. 6 and 7, the circular saw blade 106 defines oppositely oriented first and second faces 116, 118 thereof, joined by a cutting edge 120 extending around a periphery of the circular saw blade 106. As shown in FIG. 7, the saw blade 106 further defines a working side 122 of the circular saw blade 106 for cutting through the workpiece 102, and a non-working side 124 of the circular saw blade 106 extending oppositely from the working side 122 of the circular saw blade 106. In FIG. 7, the working side 122 of the circular saw blade 106 extends to the left of a vertical centerline 125, and the non-working side 124 of the circular saw blade 106 extends to the right of the vertical centerline 125.

As shown in FIGS. 4-6, workpiece support arrangement 110 of the first exemplary embodiment of the sawing apparatus 100 is configured for supporting the workpiece 102 in the workpiece support arrangement, in such a manner that the workpiece 102 is oriented to extend through the cutting plane 104 in the manner indicated in FIGS. 6 and 7.

As further illustrated in FIGS. 4-7, the workpiece support arrangement 110 of the first exemplary embodiment of the sawing apparatus 100 includes a first blade stabilizer 126 having a stabilizer contact element 128 adapted to bear against the circular saw blade 106, and exert a force against the first face 116 of the circular saw blade 106 in a direction substantially perpendicular to the cutting plane 104 at a point of contact 130 proximate the axis of motion 112 on the working side 122 of the saw blade 106 as the circular saw blade arrangement 108 and workpiece support arrangement 110 move relative to one another along the axis of motion 112. In the first exemplary embodiment of the sawing apparatus 100, the workpiece support arrangement 110 is substantially stationary, and the circular saw blade arrangement 108 is configured to move the axis of rotation 104 of the circular saw blade 106 along the axis of motion 112 in such a manner that the cutting edge 120 of the saw blade 106 intersects the workpiece 102 extending through the cutting plane 104, to thereby cut the workpiece 102 with the saw blade 106. It will be noted that, in the first exemplary embodiment of the sawing apparatus 100, the axis of motion 112 is substantially a linear, straight line. It is contemplated, however, that in other embodiments of the invention, relative motion between the circular saw blade arrangement and the workpiece support arrangement may take other forms and follow different paths, some of which may be other than a straight line, in effecting relative motion between the circular saw blade arrangement and the workpiece support arrangement.

FIG. 7 shows the saw blade 106 with representative teeth on the cutting edge 120 of the saw blade oriented and configured such that the leading edges of the teeth bite into the workpiece 102 as the saw blade is rotated in a counter clockwise direction (as oriented in FIG. 7) about the axis of rotation 114 of the saw blade 106. It will be understood by those having skill in the art, however, that in practicing the invention the saw blade 102 might have other tooth forms and rotate in a clockwise direction, opposite to that illustrated in FIG. 7.

It is contemplated that the configuration of teeth or other cutting elements of the cutting edge 120 of a saw blade, and the direction of rotation of a saw blade, used in practicing the invention will be of any shape, direction and rotational speed appropriate for practicing the invention in its various forms.

As illustrated in FIGS. 4-12, because the first blade stabilizer 126 is fixedly attached to the workpiece support arrangement 110, the first blade stabilizer 126 remains in a substantially fixed, constant position with respect to the workpiece 102 as the cutting blade 106 and workpiece support arrangement 110 move relative to one another to bring the cutting edge 120 of the saw blade into contact with and movement through the workpiece 102, along the cutting plane 104.

As shown in FIGS. 8-10, the stabilizer contact element 128 of the first blade stabilizer 126 of the first exemplary embodiment of the sawing apparatus 100 is retractable away from the saw blade 106. This retractability allows for passage of portions of the cutting edge 120, such as saw teeth for example, which extend outward beyond the first face 116 of the saw blade 106.

Figure 11:
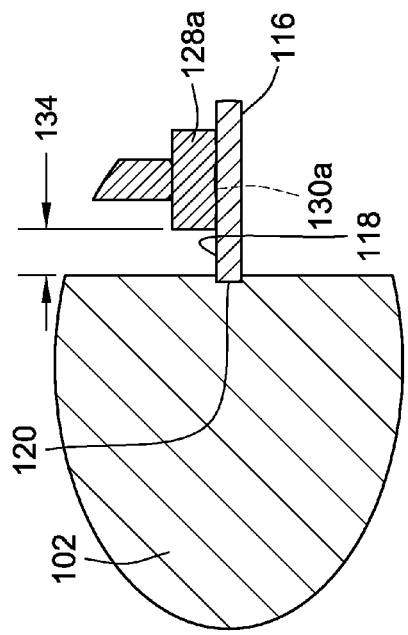
FIGS. 11 and 12 are enlarged views taken as indicated by dashed lines in FIGS. 9 and 10 respectively.

As indicated in FIG. 6, the first exemplary embodiment of the sawing apparatus 100 also includes a control arrangement 132 operatively connected between the stabilizer contact element 128 and the blade 106, for automatically retracting the stabilizer contact element 128 when the cutting edge 120 enters a predetermined zone of proximity 134, as shown in FIG. 11 to the stabilizer contact element 128, to thereby preclude contact between the cutting edge 120 and the stabilizer contact element 128.

Figure 13:
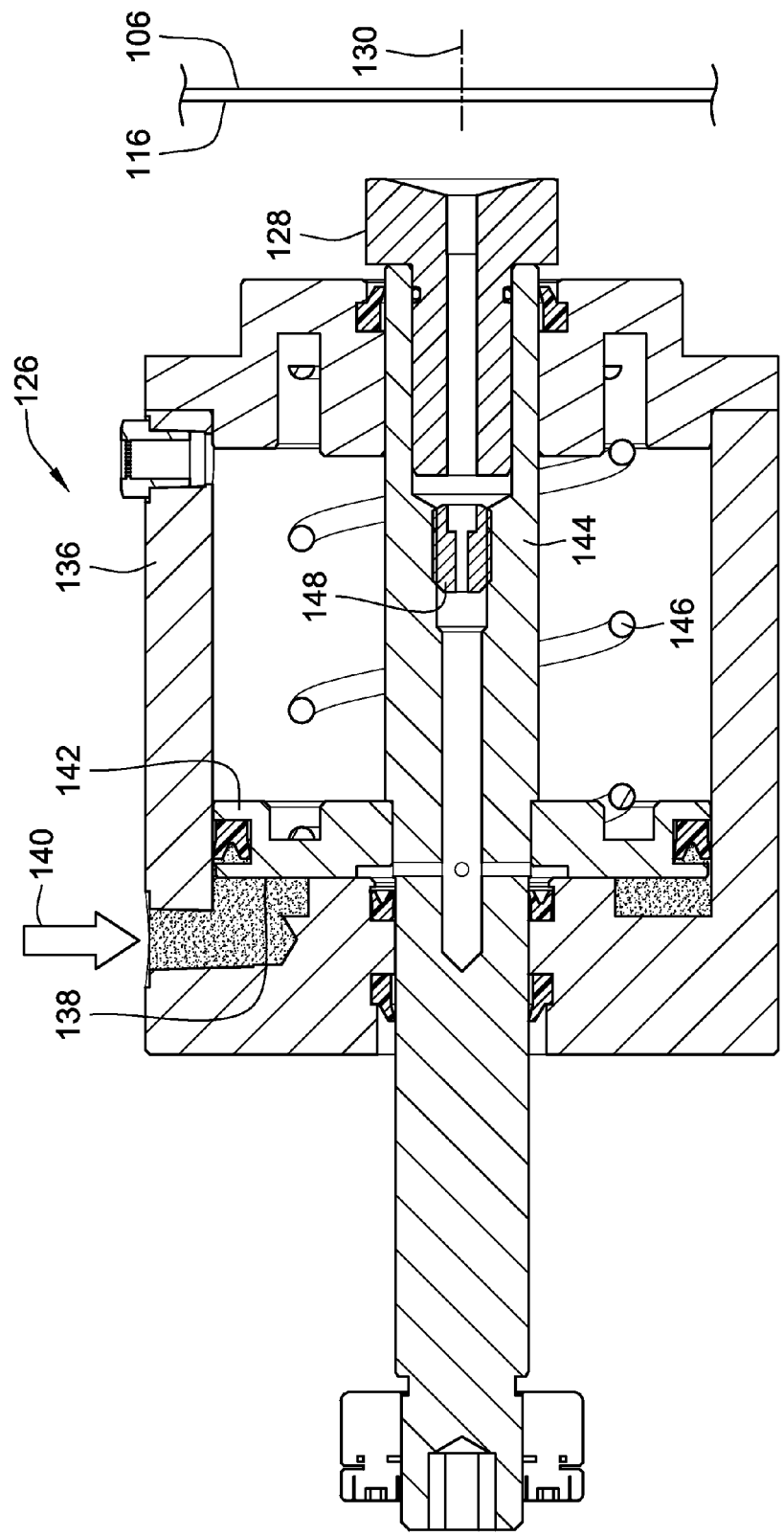
FIGS. 13 and 14 are cross sectional illustrations of an exemplary embodiment of a first blade stabilizer, according to the invention, with FIG. 13 showing a stabilizer contact element of the first blade stabilizer in a retracted position and FIG. 14 showing the contact element in an extended position in which the contact element bears against a face of the circular saw blade.
Figure 14:
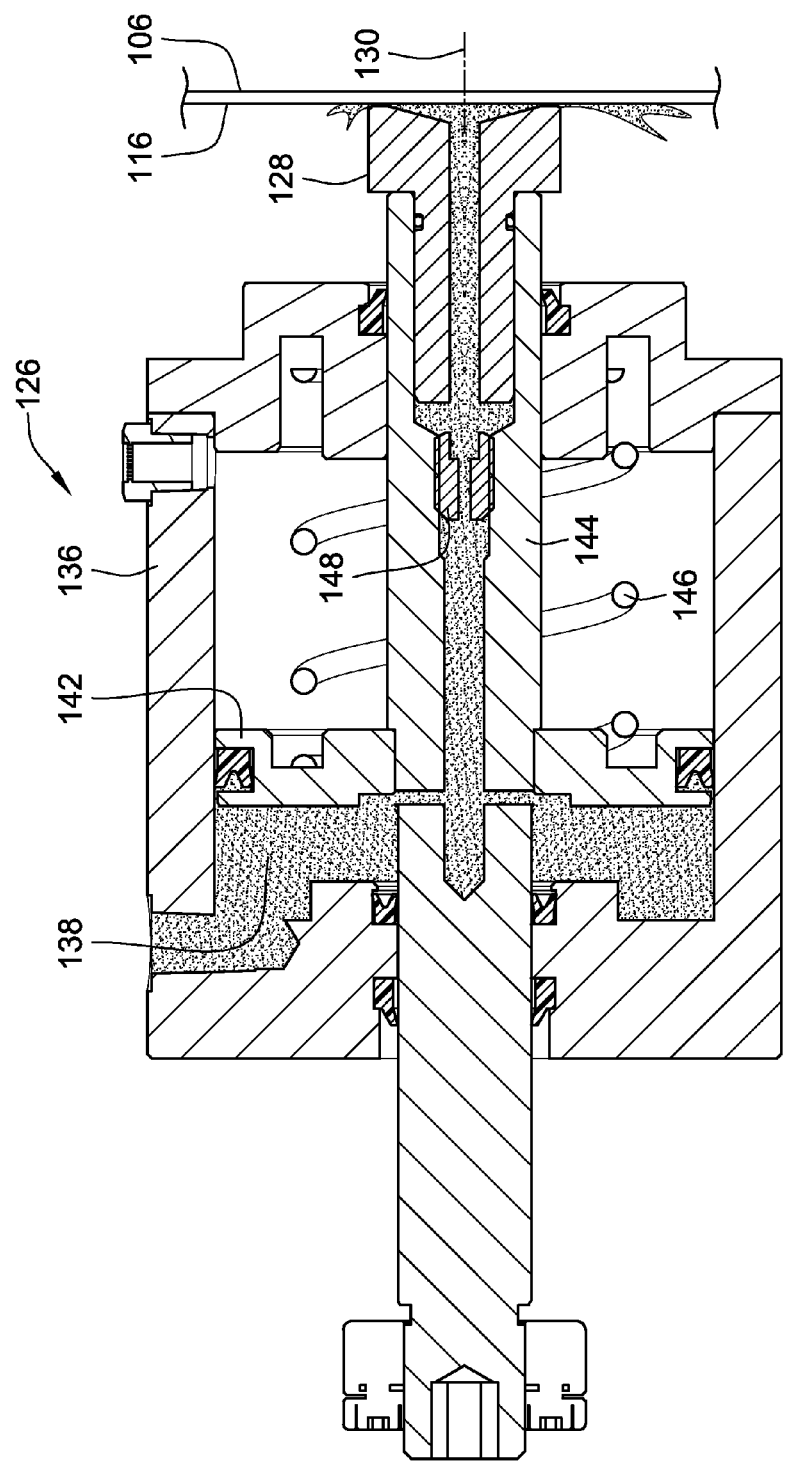

As shown in FIGS. 13 and 14, the first blade stabilizer 126 is a fluid-actuated device including a stabilizer body 136, defining a fluid pressure chamber 138 operatively connected to the stabilizer contact element 128 for urging the stabilizer contact 128 to move in a direction perpendicular to the saw blade 106 in response to the application of an actuating fluid pressure, as indicated by arrow 140, within the fluid pressure chamber 138, to move the stabilizer contact element 128 from a retracted position as shown in FIG. 13 to an extended position as shown in FIG. 14. More specifically, the blade stabilizer 126 illustrated in FIGS. 13 and 14 includes a piston 142 attached to a cylinder shaft 144 for movement within the stabilizer body. The contact element 128 is mounted on a distal end of the cylinder shaft 144, in a position where it can contact the first face 116 of the saw blade 106 when the first blade stabilizer 126 is actuated in the manner shown in FIG. 14 by application of fluid pressure 140 to the fluid pressure chamber 138.

In various embodiments of the invention, it is contemplated that a first blade stabilizer may taken any appropriate form. In the embodiments shown in FIGS. 13 and 14, the contact element 128 is brought into contact with the saw blade 106 through application of a pressurized fluid such as, but not limited to compressed air or other gas, or liquids such as oil, hydraulic fluid, cutting fluid, etc. It is specifically contemplated that in some embodiments of the invention a blade stabilizer, in accordance with the invention may also be actuated with any other form of applicable actuator including, but not limited to: electrical solenoids or motors, magnetic devices, geared or screw type mechanical actuators, or any other combination of actuation arrangement suitable for practicing the invention.

As shown in FIGS. 13 and 14, the first blade stabilizer 126 of the first exemplary embodiment of the sawing apparatus 100 also includes a return spring 146 for urging movement of the stabilizer contact element 128 to a non-actuated position, such as the one shown in FIG. 13, when actuating fluid pressure 140 is not present in the fluid pressure chamber 138. It is contemplated that, in other embodiments of the invention, other return devices may be utilized in practicing the invention with efficacy. It is also contemplated, within the scope of the invention, that some embodiments of the invention may include a spring-type element for actuating the stabilizer contact 128 in a manner urging the contact element 128 against the saw blade 106 in a non-actuated state of the first blade stabilizer.

As also shown in FIGS. 13 and 14, the first blade stabilizer 126 of the first exemplary embodiment of the sawing apparatus 100 includes internal passageways within the cylinder shaft 144 and the contact element 128. These internal passageways are operatively connected in fluid communication with the fluid pressure chamber 138 in such a manner that pressurized fluid from the fluid pressure chamber is directed between the stabilizer contact element 128 and the first face 116 of the saw blade 106, in the manner illustrated in FIG. 14, when the stabilizer contact element 128 is proximate to the face 116 of the saw blade 106. As further illustrated in FIGS. 13 and 14, the first blade stabilizer 126 of the first exemplary embodiment of the sawing apparatus 100 also includes a flow restrictor 148 to limited flow of the pressurized fluid 140 directed between the stabilizer contact element 128 and the face 116 of the saw blade 106.

Figure 1:
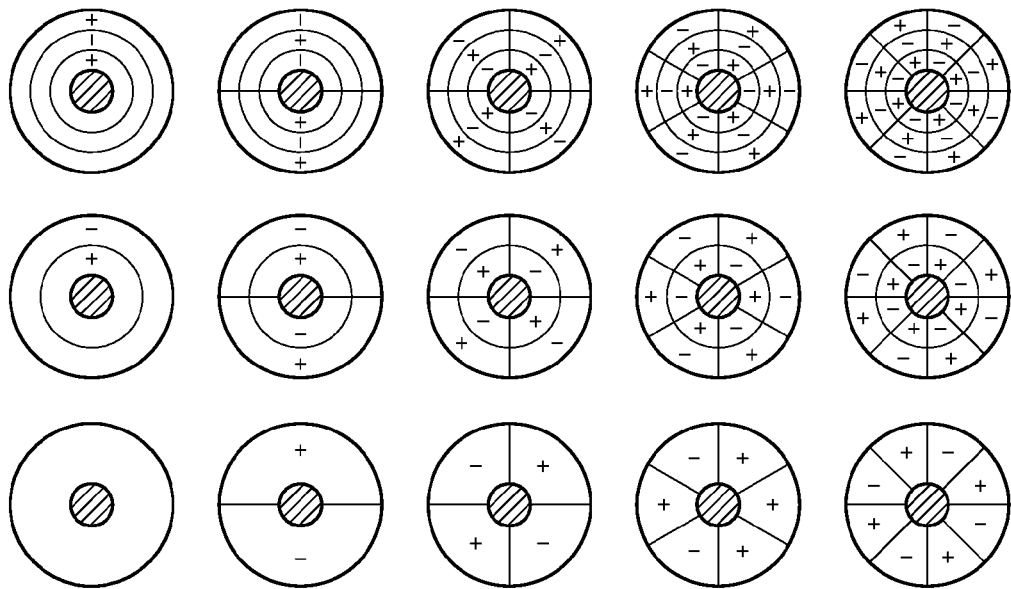
FIG. 1 (prior art) is a chart tabulating a number of different vibration patterns which may be encountered in a center-clamped circular plate, such as a circular saw blade, when excited at different natural frequencies.
Figure 2:
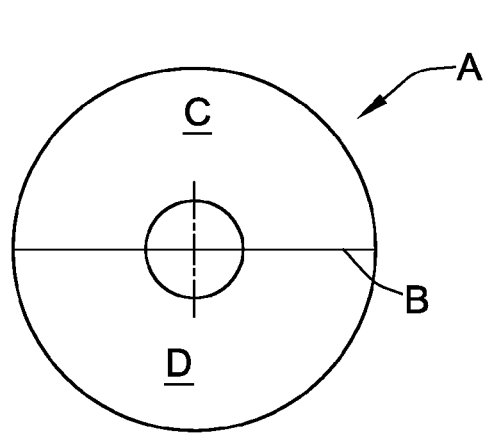
FIG. 2 (prior art) is a schematic illustration of a first mode of vibration of a center-clamped circular plate.
Figure 3:
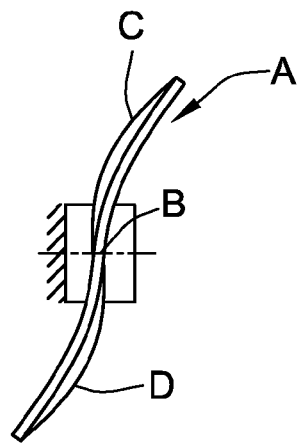
FIG. 3 (prior art) is a schematic illustration taken perpendicular to an axis of rotation of a center-clamped disk, showing deflections of the disc in opposite directions when the disk is excited at its first natural frequency, with the degree of deflection exaggerated for purposes of illustration.

In practicing the invention, it is contemplated that the first blade stabilizer, operatively connected in a fixed relationship to the workpiece 102 in the manner described above, will provide improved stabilization to the saw blade 106 regardless of the exact location of the point of contact 130 of the stabilizer contact element 128 with one or the other sides 116, 118 of the saw blade 106. Experience has shown, however, that for providing optimal stabilization of the saw blade 106 in some embodiments of the invention, it is desirable to have the point of contact 130 be positioned proximate to the axis of motion 112 along a diametral line 148 extending through the axis of rotation 114 of the saw blade 106 and a point of initial contact 147 on the periphery of the saw blade 106 of the cutting edge 120 of the saw blade 106 with the workpiece 102. With such an arrangement, the force exerted by the contact element 128 at the point of contact 130 tends to cause the single node B, as illustrated in FIG. 2, for the saw blade 106 (i.e. the disk A of FIG. 2) to extend diametrally through the axis of rotation 114 of the saw blade 106 and the initial point of contact 147 between the cutting edge 120 of the saw blade 106 and the outer surface of the workpiece 102. With reference to FIG. 3, those having skill in the art will recognize that having the contact element 128 and the single node B oriented in this fashion minimizes displacement of the cutting edge 120 of the saw blade 106 in the area where the cutting edge 120 is entering into the workpiece 102.

As a practical matter, however, it may not be possible, or desirable, in some embodiments of the invention to have the stabilizer contact element 128 of the first blade stabilizer 126 contact the saw blade 106 directly along either the line of motion 112 or the diametral line 148 extending through the axis of rotation 114 of the saw blade 106 and the point of initial contact 147 between this cutting edge 120 and the outer surface of the workpiece 102. Such difficulties may be encountered, for example, when the workpiece 102 has an odd shaped, or non-uniform outer surface. It may also be desirable in some applications of the invention to have the contact element 128 displaced somewhat from the axis of motion 112 and/or the diametral line 148 to accommodate movement of other structural elements or features of a sawing apparatus, such as a hub 150 securing the saw blade 106 for rotation about the axis of rotation 114 of the saw blade 106. By displacing the contact element 128 somewhat from the line of motion 112, for example, the saw blade 106 may be able to make a deeper cut in the workpiece 102 without interference between the hub 150 and the contact element 128, in some embodiments of the invention.

Generally speaking, as indicated FIG. 7, the invention has been shown to provide enhanced blade stabilization in various embodiments wherein the contact element 128 contacts one of the faces 116, 118 of the saw blade 106 within a region of proximity 151 of the axis of motion 112 and/or the diametral line 148 where the zone of proximity 151 has a width of approximately ⅓ of the diameter of the saw blade 102 extending along either or both of the axis of motion 112 and the diametral line 148.

Figure 11A:
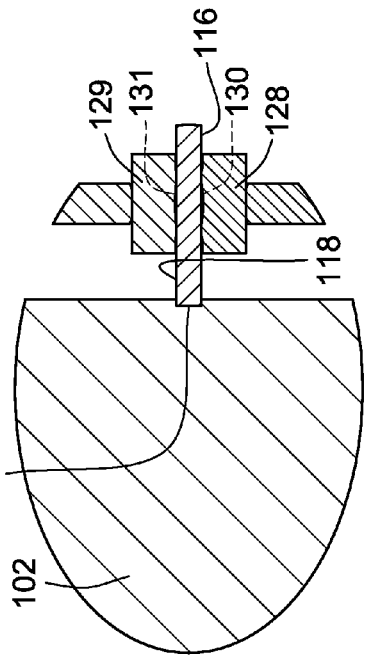
FIGS. 11a and 11b are enlarged views similar to FIG. 11, illustrating alternate embodiments of contact elements for first blade stabilizers, according to the invention.

As shown in FIG. 11a, although the first exemplary embodiment of the sawing apparatus 100 described hereinabove has a contact element 128 of a first blade stabilizer 126 which may be selectively brought to bear against the first face 116 of the saw blade 106, in other embodiments of the invention it may be desirable to have a contact element 128a of a first blade stabilizer operatively arranged to contact the second face 118 of the saw blade at a point of contact 130a.

Figure 11B:
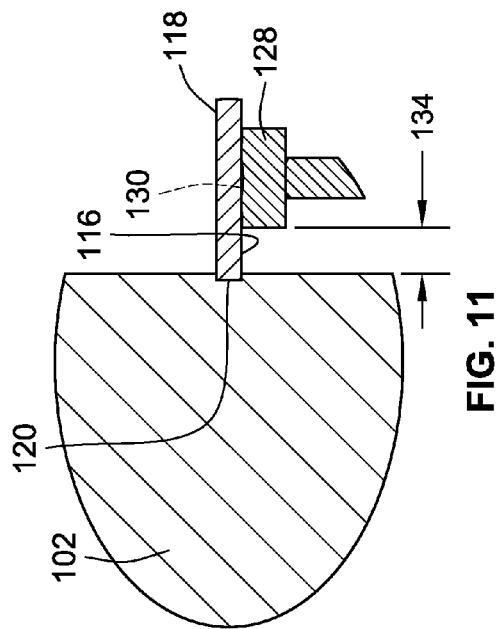
Figure 12:
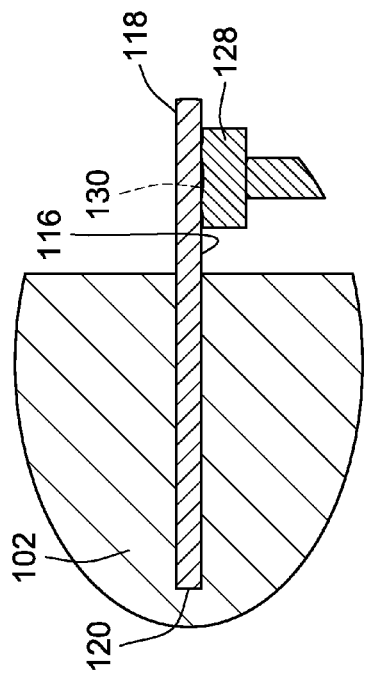

Although it is contemplated that in many embodiments of the invention only a single first blade stabilizer 126 may be utilized with efficacy for blade stabilization, it is also contemplated that in some embodiments of the invention, as shown in FIG. 11b, it may be desirable to include two or more first blade stabilizers 126, of the type described hereinabove, such that the stabilizer contact elements 128, 129 of the two first blade stabilizers 126 contact the first and second faces 116, 118 of the saw blade 106 at respective first contact points 130, 131. It will be further noted, that although the contact elements 128 and 129 are substantially oppositely directed and directly axially opposed to one another in the exemplary embodiment of FIG. 11b, it will be appreciated that in other embodiments of the invention multiple first blade stabilizers need not necessarily be positioned exactly opposite from one another on opposite sides of the saw blade.

Where two or more first blade stabilizers, according to the invention, are utilized it is further contemplated that in some embodiments of the invention the multiple first blade stabilizers may be operatively mounted for bearing against the first and second faces 116, 118 respectively of the saw blade 106. In some embodiments, such multiple first stabilizer contact elements may be positioned for contacting the first and second faces 116, 118 along a common axis of force extending substantially perpendicular to the faces 116, 118 of the saw blade 106.

Such multiple first blade stabilizers 126 may also be operatively positioned and controlled either independently, or in a cooperative manner in some embodiments of the invention, to allow for adjustment of the forces exerted against the faces 116 and/or 118 of the saw blade 106. A control arrangement 132 may operatively interconnect such multiple first blade stabilizers in a manner allowing for active adjustment of the force being exerted by the stabilizer elements, or for other actions such as extending and retracting the stabilizer contact elements as a function of some parameter of operation of the sawing arrangement, such as the proximity of the cutting edge 120 to the first blade stabilizer contact element. The position and force exerted by the various stabilizer contact elements 128 may also be controlled as a function of any appropriate operating parameter, such as: a measured displacement or vibration of the saw blade 106, the position of the axis of rotation 114 of the saw blade 106; the diameter, shape or thickness of the workpiece 102; etc.

As shown in FIGS. 4-6, 8-10, 15 and 16, the first exemplary embodiment of the sawing apparatus 100 also includes a secondary blade stabilizer arrangement 152 mounted opposite the first blade stabilizer 126, substantially along the axis of motion 112 of the saw blade 106. The secondary blade stabilizer arrangement 152 is mounted in a fixed relationship to the rotational axis 114 of the saw blade 106, and has two stabilizer contact elements in the form of rollers 154, 156 (see FIG. 17) adapted to bear against the first and second faces 116, 118 respectively of the circular saw blade 106.

As will be understood from the discussion below, the rollers 154, 156 of the secondary blade stabilizer arrangement 152 are configured to be selectively disposed with regard to the saw blade 106 in such a manner that the rollers 154, 156 exert a force against the saw blade 106 in a direction substantially perpendicular to the cutting plane at a point on the blade faces 116, 118 proximate the axis of motion 112 of the saw blade 106 on the non-working side 124 of the blade 106 as the axis of rotation 114 of the circular saw blade 106 moves along the axis of motion 112 of the saw blade 106. Stated another way, whereas the relative position between the contact element 128 of the first blade stabilizer 126 varies with respect to the axis of rotation 114 of the saw blade 106 as the workpiece 102 and the axis of rotation 114 move relative to one another during the cutting process, the points of contact between the secondary stabilizer contact elements 154, 156 remain constant with respect to the axis of rotation 114 of the saw blade 106 during the cutting operation.

As shown in FIGS. 15-18, the secondary blade stabilizer arrangement 152 of the first exemplary embodiment of the sawing apparatus 100 includes a pair of identical secondary stabilizers 158 mounted in a common secondary stabilizer mount 160.

As shown in FIGS. 17 and 18, each of the secondary stabilizers 158 includes a rotatable secondary stabilizer mounting shaft 162 defining a central axis 164 thereof. The secondary stabilizer mounting shafts 162 are secured within the secondary stabilizer mount 160 in such a manner that the axes 164 of the secondary stabilizer mounting shafts 162 extend substantially parallel to one another along the opposite faces 116, 118 of the saw blade 106. The secondary stabilizer mount is further configured to allow the secondary stabilizer mounting shafts to slide toward and/or away from the axis of rotation 114 of the saw blade 106. The secondary stabilizer mount 160 is further configured such that the secondary stabilizer mounting shafts may be rotated about their respective axis 164 in the secondary stabilizer mount 160. As illustrated in FIG. 15, a distal end 166 of the secondary stabilizer mounting shafts 162 are preferably knurled, or otherwise configured to facilitate grasping the distal end of the secondary stabilizer mounting shafts 162 for adjusting the position of the rollers 154, 156 substantially linearly with respect to the axis of rotation 114 of the saw blade 106.

Figure 19:
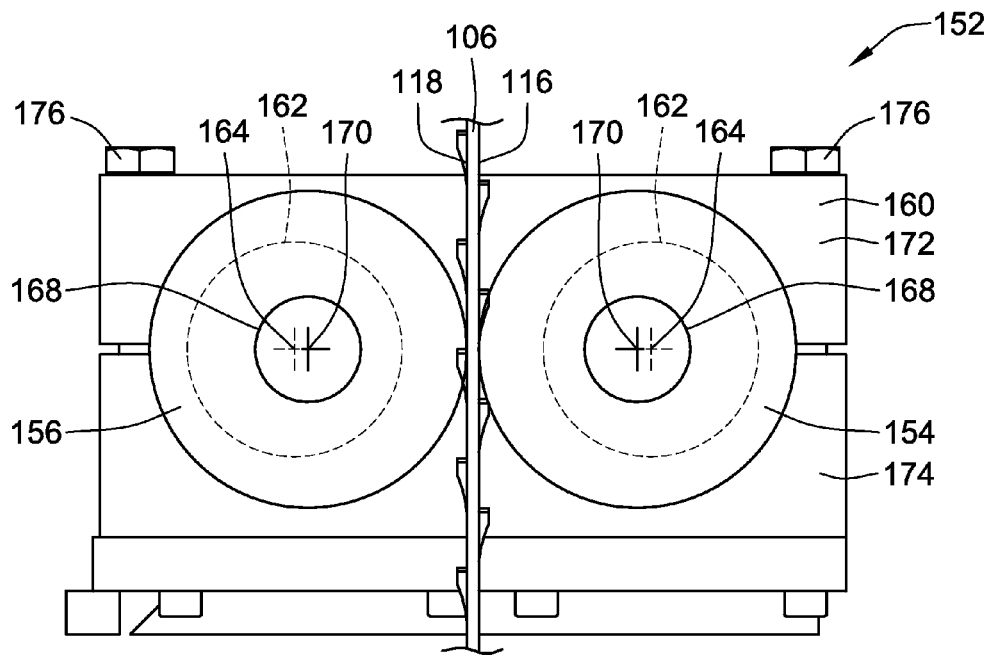
FIGS. 19 and 20 illustrate operation of the secondary blade stabilizer of FIG. 17.

As shown in FIGS. 17 and 18, the secondary stabilizer mounting shafts 162 are further configured to provide an eccentric portion 168 thereof, upon which the rollers 154, 156 are respectively mounted for rotation about an eccentric axis 170 offset from the axis 164 of the secondary stabilizer mounting shaft 162, with the eccentric axis 170 extending substantially parallel to the axis 164 of the secondary stabilizer mounting shaft 162. By virtue of this eccentric arrangement, as the secondary stabilizer mounting shafts 162 are rotated within the secondary stabilizer mount 160, the rollers 154, 156 of the secondary stabilizer arrangement 152 are urged toward or away from one or the other of the respective first and second faces 116, 118 of the saw blade 106. In this manner, the outer surfaces of the secondary stabilizer rollers 154, 156 can be brought into or out of proximity and/or contact with the first and second faces 116, 118 of the saw blade 106, in the manner illustrated in FIGS. 17, 19 and 20.

Figure 20:
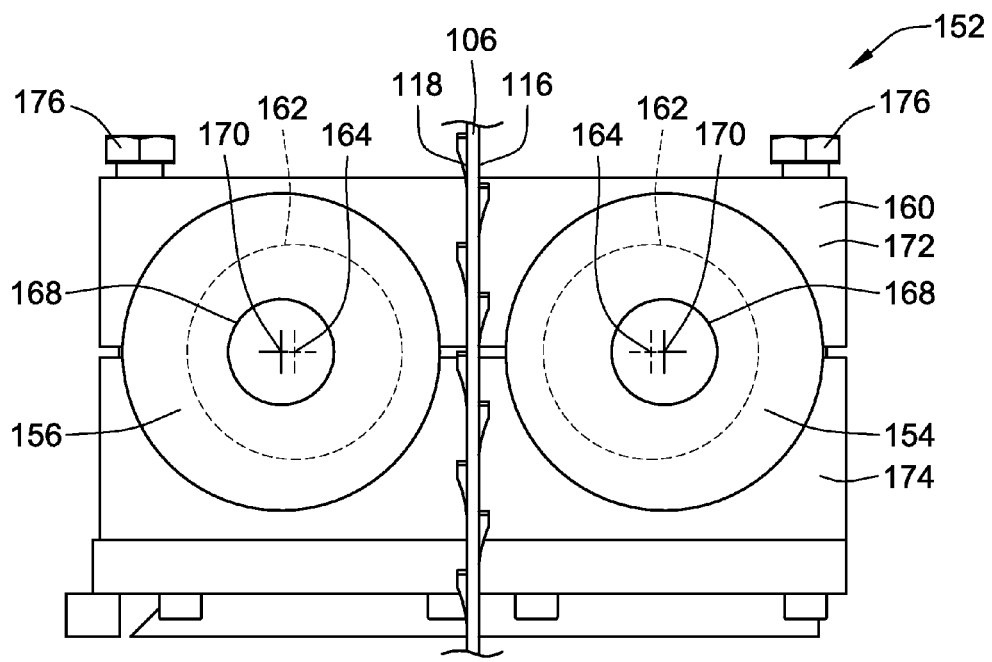

In the exemplary embodiment of the secondary blade stabilizer arrangement 152 of the first exemplary embodiment of the sawing apparatus 100, the secondary stabilizer mount 160 takes the form of a split block arrangement having first and second clamping elements 172, 174 joined by threaded fasteners 176 in such a manner that, with the fasteners 176 loosened as shown in FIG. 20, the secondary stabilizer mounting shafts 162 may be rotated within the secondary stabilizer mount 160 and/or moved axially through the secondary stabilizer mount 160 for achieving a desired position of the rollers 154, 156. Once the desired positioning of the rollers 154, 156 is achieved, the threaded fasteners 176 are tightened to clamp the secondary stabilizer mounting shafts 162 in a fixed location in the manner indicated in FIG. 19.

Figure 21:
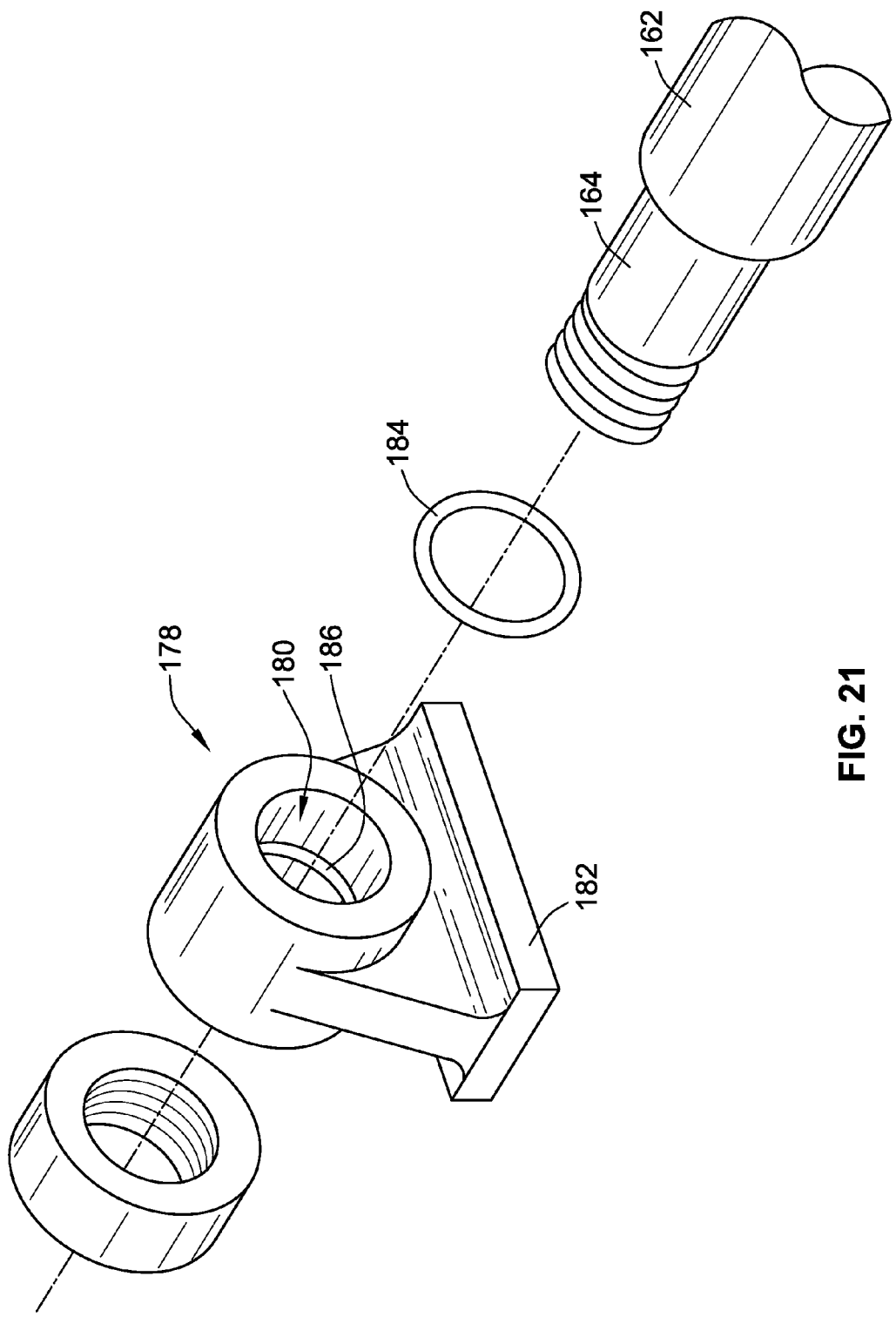
FIGS. 21-23 illustrate an alternate embodiment of a secondary stabilizer contact element for an alternate embodiment of a secondary stabilizer arrangement, according to the invention.
Figure 22:
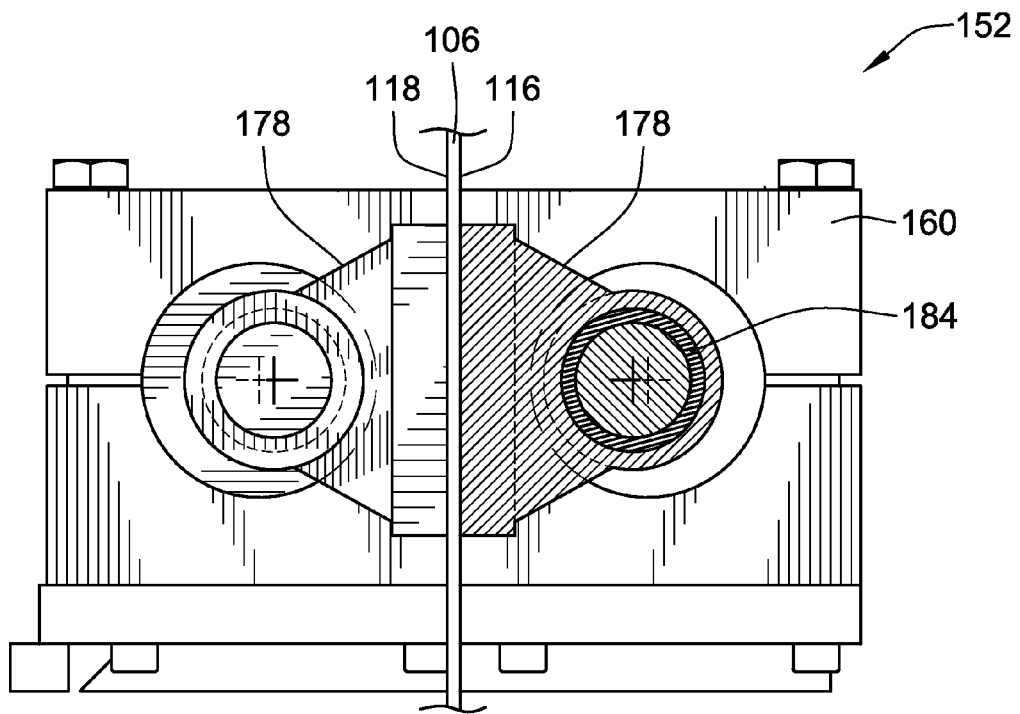
Figure 23:
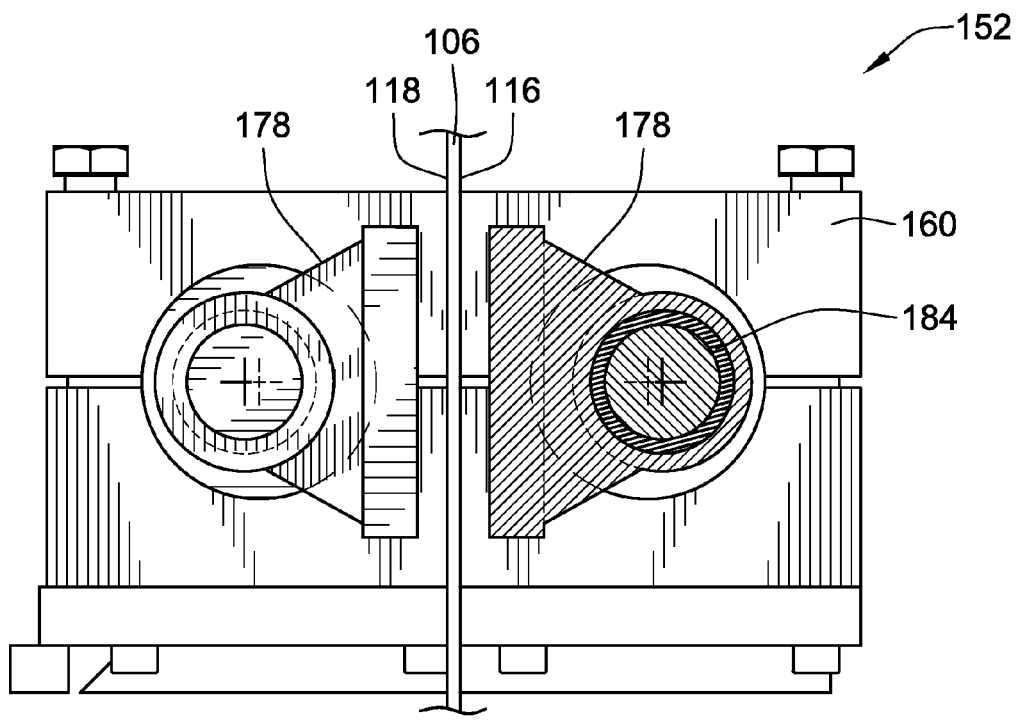

Those having skill in the art will recognize that a secondary stabilizer according to the invention may take a variety of forms other than those described above with reference to FIGS. 15-20. For example, in one variation of the basic secondary stabilizer arrangement 152 described above, the rollers 154, 156 may be replaced by a secondary stabilizer contact element in the form of a stabilizer shoe 178, such as the one illustrated in FIGS. 21-23. As shown in FIG. 21, the stabilizer shoe 178 has a body thereof defining a bore 180 configured to be rotatably mounted on the eccentric portion 168 of the secondary stabilizer mounting shaft 162. The stabilizer shoe 168 further defines a contact face 182 adapted for contacting one of the sides 116, 118 of the saw blade 106, in the manner illustrated in FIGS. 22 and 23. Those having skill in the art will recognize that operation of the variation of the secondary stabilizer arrangement 152A shown in FIGS. 22 and 23 is substantially the same as for the previously described exemplary embodiment of the secondary blade stabilizer arrangement 152 shown in FIGS. 19 and 20.

In order to facilitate manipulation and positioning of the stabilizer shoes 178 in the alternate embodiment of the secondary blade stabilizer arrangement 152, the alternate embodiment of the secondary blade stabilizer arrangement 152A includes a rotation resisting element in the form of an O-ring 184 disposed in an annular groove 186 within the bore 180 of the stabilizer shoe 178. As shown in the sectional portions on the right side of both FIGS. 22 and 23, the O-ring 184 is clamped between the stabilizer shoes 184 and the eccentric portion 168 of the secondary stabilizer mounts shafts 162, when the stabilizer shoes 178 are mounted on the eccentric portions 168, in such a manner that friction between the O-ring 184 and the surface of the eccentric portion 168 provides sufficient resistance to rotation of the stabilizer shoe 178 to hold the contact face 182 of the stabilizer shoe 178 proximate to the face (116 or 118) of the saw blade 106 during adjustment of the position of the stabilizer shoes 178.

As shown in FIGS. 4-6 and 15, the first exemplary embodiment of the sawing apparatus 100 also includes an additional, tertiary, blade stabilizer 188 having substantially the same form as the secondary blade stabilizer arrangement 152. As previously noted, it is contemplated that various embodiments of the invention may include two or more secondary additional or tertiary blade stabilizer arrangements than the first exemplary embodiment of the sawing apparatus 100.

Figure 24:
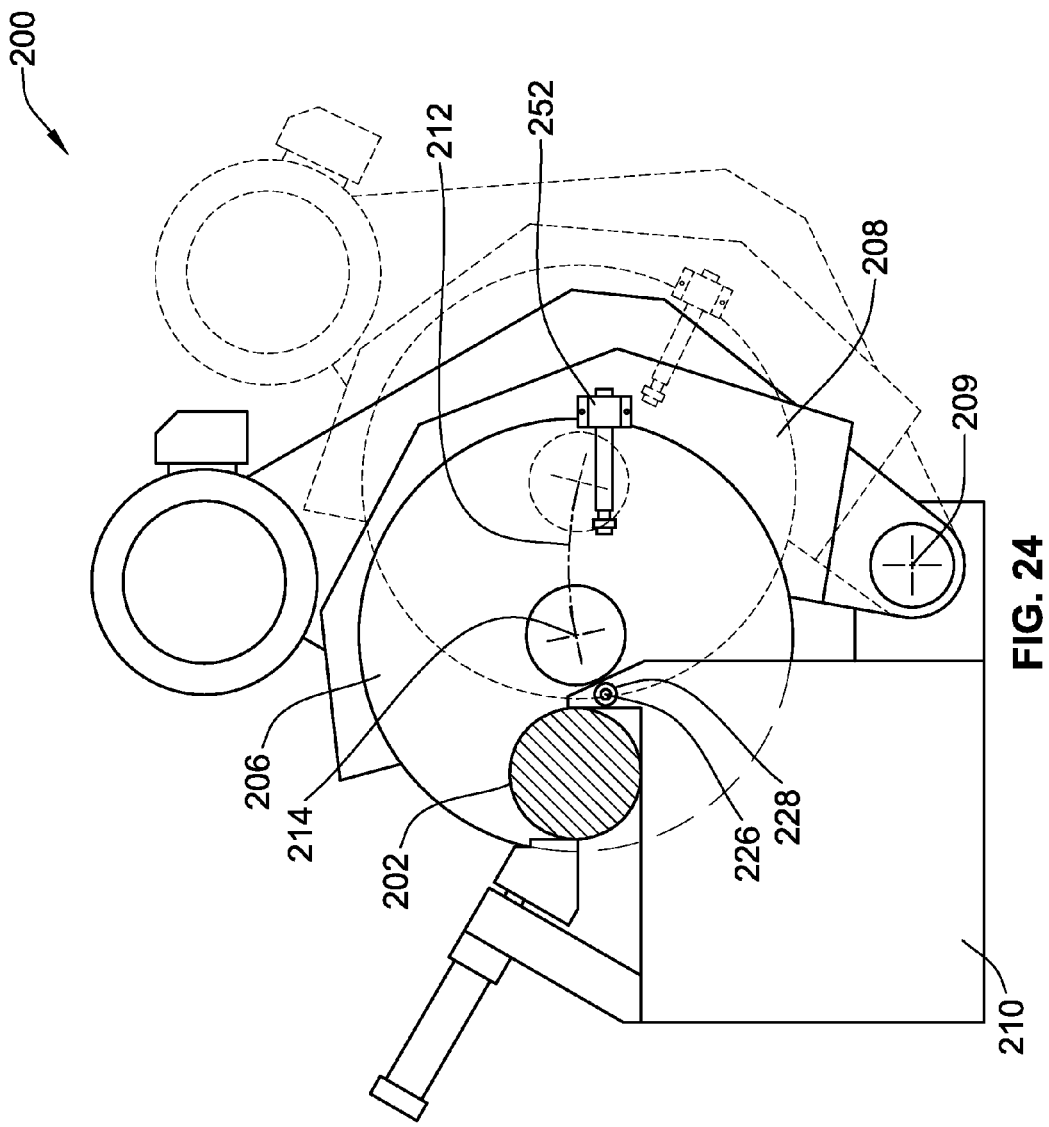
FIG. 24 is a schematic illustration of a second exemplary embodiment of a sawing apparatus, according to the invention, utilizing a pivoting motion for the saw blade rather than a linear motion as in the first exemplary embodiment of the sawing apparatus of FIG. 4.

FIG. 24 shows a second exemplary embodiment of a sawing apparatus 200, according to the invention. In the second exemplary embodiment of the sawing apparatus 200, a circular saw blade 206 is operatively mounted in a circular saw blade arrangement 208 which is pivotably joined to a workpiece support arrangement 210 for pivoting motion of the circular saw blade arrangement 208 about a sawing apparatus pivot point 209. By virtue of this arrangement, the axis of motion 212 of the axis of rotation 214 of the circular saw blade 206 is curved rather than being straight as was the case for the axis of motion 112 in the first exemplary embodiment of the sawing apparatus 100 described hereinabove.

The workpiece support arrangement 210 of the second exemplary embodiment of the sawing apparatus 200 includes a first blade stabilizer 226 fixedly mounted to the workpiece support arrangement 210 in a fixed relationship to the workpiece 202, during operation of the sawing apparatus 200. The first blade stabilizer arrangement 226 includes a first blade stabilizer contact element 228 which operates in the same manner described in more detail hereinabove with regard to the contact element 128 of the first blade stabilizer 126 of the first exemplary embodiment of the sawing apparatus 200, such that the contact element 228 of the first blade stabilizer 226 may be selectively brought into varying contact with one of the faces of the saw blade 206 of the second exemplary embodiment of the sawing apparatus 200.

As also shown in FIG. 24, the circular saw blade arrangement 208 of the second exemplary embodiment of the sawing apparatus 200 includes a secondary stabilizer 252 having a configuration and operating in a manner substantially similar to the secondary stabilizer 152 of the first exemplary embodiment of the sawing apparatus 100 described in greater detail above. As was the case with the first exemplary embodiment of the sawing apparatus 100, the secondary stabilizer 252 in the second exemplary embodiment of the sawing apparatus is mounted on the circular saw blade arrangement in such a manner that the contact elements of the secondary stabilizer 252 remain in a constant relationship to the axis of rotation 214 of the saw blade 206 as the circular saw blade arrangement 208 pivots about the pivot point 209 during operation of the second exemplary embodiment of the sawing apparatus 200.

In general, it will be appreciated by those having skill in the art that, the secondary exemplary embodiment of the sawing apparatus 200 operates substantially in the same manner as the first exemplary embodiment of the sawing apparatus 100 as relative motion between the circular saw blade arrangement 208 and workpiece support arrangement 210 are affected through pivoting motion of the circular saw blade arrangement 208 about the pivot point 209 from a maximum retracted position of the circular saw blade arrangement 208 shown in dashed lines in FIG. 24 and a maximum extended position of the circular saw blade arrangement 208 as shown by solid lines in FIG. 24.

In practicing the invention, it is contemplated that stabilization of the circular saw blade is effective with a wide variety of traditional and non-traditional cutting surfaces of the saw blade. Experience has shown, however, that the stabilizing apparatuses and methods of various embodiments, according to the invention, are particularly effective when used in combination with a circular saw blade having a dual chip cutting action, in accordance with commonly assigned U.S. Pat. No. 4,463,645 to Goellner, the disclosure and teachings of which are incorporated herein in their entirety by reference. A blade 300, according to the U.S. Pat. No. 4,463,645 patent is illustrated in FIGS. 25-30. Such a blade 300 utilizes a dual chip cutting action in which all of the saw teeth 302, 304 are like width and radial height and have a similar tooth geometry. The working surface of the leading tooth face is disposed at a negative rake angle 306, and side portions of the tooth face extend outwardly and rearwardly from a central portion at a negative angle 308 to the side faces of the tooth. A single notch 310 is formed in the top face of each tooth 302 and intersects the working surface. The notch and alternate ones of the saw teeth 302 is disposed at one side of the central plane of the saw body, while the notch in the alternate ones of the saw teeth 304 is disposed at the other side of the central plane of the saw body.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventor expects skilled artisans to employ such variations as appropriate, and the inventor intends for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. An apparatus, comprising:
a workpiece support arrangement;
a saw blade arrangement including a circular saw blade having a diameter and being mounted for rotation in a cutting plane about an axis of rotation and movable along a horizontal linear axis of motion of the circular saw blade extending through the axis of rotation perpendicular to the axis of rotation and within the cutting plane for cutting a workpiece carried by the workpiece support arrangement and extending through the cutting plane along a workpiece axis extending through the cutting plane, with the circular saw blade also defining oppositely oriented first and second faces thereof joined by a cutting edge extending around a periphery of the circular saw blade, the circular saw blade further defining a working side thereof extending toward the workpiece axis along the axis of motion of the circular saw blade and a non-working side thereof extending oppositely from the workpiece axis along the axis of motion of the circular saw blade;
a first blade stabilizer mounted to the workpiece support arrangement adjacent the workpiece axis in a fixed relationship to the workpiece axis and having a stabilizer contact element adapted to bear against the circular saw blade and exert a force against the circular saw blade in a direction substantially perpendicular to the cutting plane at a point on at least one of the circular saw blade faces proximate the axis of motion of the circular saw blade on the working side of the circular saw blade as the axis of rotation of the circular saw blade moves laterally along the axis of motion;
further comprising, a secondary blade stabilizer mounted opposite the first blade stabilizer substantially along the axis of motion of the circular saw blade in a fixed relationship to the rotational axis of the circular saw blade and having one or more stabilizer contact elements adapted to bear against the circular saw blade and exert a force against the circular saw blade in a direction substantially perpendicular to the cutting plane at a point on at least one of the circular saw blade faces proximate the axis of motion of the circular saw blade on the non-working side of the circular saw blade as the axis of rotation of the circular saw blade moves along the axis of motion of the circular saw blade; and
wherein the first blade stabilizer is linearly movable with the circular saw blade along the axis of motion of the circular saw blade and the second blade stabilizer is not linearly movable with the circular saw blade along the axis of motion.

2. The apparatus of claim 1, wherein, the stabilizer contact element is retractable away from the circular saw blade.

3. The apparatus of claim 2, further comprising, a control arrangement operatively connected between the stabilizer contact element and the circular saw blade for automatically retracting the stabilizer contact element when the cutting edge enters a predetermined zone of proximity to the stabilizer contact element, to thereby preclude contact between the cutting edge and the stabilizer contact element.

4. The apparatus of claim 1, wherein, the first blade stabilizer includes a fluid pressure chamber operatively connected to the stabilizer contact element for urging the stabilizer contact element to move in a direction perpendicular to the circular saw blade in response to the application of an actuating fluid pressure within the fluid pressure chamber.

5. The apparatus of claim 4, wherein, the first blade stabilizer further includes a return spring for urging movement of the stabilizer contact element to a non-actuated position when actuating fluid pressure is not present in the fluid pressure chamber.

6. The apparatus of claim 5, wherein, pressurized fluid from the fluid pressure chamber is directed between the stabilizer contact element and the face of the circular saw blade, when the stabilizer contact element is proximate to the face of the circular saw blade.

7. The apparatus of claim 4, wherein, pressurized fluid from the fluid pressure chamber is directed between the stabilizer contact element and the face of the circular saw blade, when the stabilizer contact element is proximate to the face of the circular saw blade.

8. The apparatus of claim 7, further comprising, a flow restrictor to limit flow of the pressurized fluid directed between the stabilizer contact element and the face of the circular saw blade.

9. The apparatus of claim 1, wherein, the secondary stabilizer contact elements are retractable away from the circular saw blade.

10. The apparatus of claim 1, wherein, the secondary stabilizer includes first and second secondary stabilizer contact elements operatively mounted for bearing against the first and second faces of the circular saw blade.

11. The apparatus of claim 10, wherein, the first and second secondary stabilizer contact elements are independently adjustable in a direction substantially perpendicular to the cutting plane for bringing the first and second secondary stabilizer elements into a bearing relationship against the first and second faces of the circular saw blade respectively.

12. The apparatus of claim 11, wherein, at least one of the secondary stabilizer contact elements is eccentrically mounted on a rotatable secondary stabilizer mounting shaft defining an axis thereof in such a manner that rotation of the mounting shaft about the axis defined thereby urges the secondary stabilizer contact element mounted to that shaft toward the circular saw blade.

13. The apparatus of claim 12, wherein, the at least one secondary stabilizer contact element is a stabilizer roller mounted for rotation about a stabilizer roller axis that is offset from and extends substantially parallel to the secondary stabilizer mounting shaft axis, with the stabilizer roller having an outer surface thereof adapted for contact with a face of the circular saw blade.

14. The apparatus of claim 12, wherein, the secondary stabilizer is also movable along the axis of the secondary stabilizer mounting shaft.

15. The apparatus of claim 14, wherein, the at least one secondary stabilizer contact element is a stabilizer roller mounted for rotation about a stabilizer roller axis that is offset from and extends substantially parallel to the secondary stabilizer mounting shaft axis, with the stabilizer roller having an outer surface thereof adapted for contact with a face of the circular saw blade.

16. The apparatus of claim 14, wherein:
the circular saw blade is movable along the axis of motion between a maximum retracted position and a maximum extended position of the circular saw blade with respect to the workpiece axis; and
the secondary stabilizer contact elements are positioned between the cutting edge and the axis of the circular saw blade regardless of the position of the circular saw blade along the axis of motion.

17. The apparatus of claim 12, wherein, the at least one secondary stabilizer contact element is a stabilizer shoe mounted for pivotable movement about a secondary stabilizer shoe axis that is offset from and extends substantially parallel to the secondary stabilizer mounting shaft axis, with the stabilizer shoe having an outer surface thereof adapted for contact with a face of the saw blade.

18. The apparatus of claim 17, further comprising, a resistance element operatively disposed between the stabilizer shoe and the secondary stabilizer mounting shaft for resisting pivotable movement of the stabilizer shoe with respect to the secondary stabilizer mounting shaft.

19. The apparatus of claim 18, wherein:
the secondary stabilizer mounting shaft defines an eccentric portion thereof centered about the secondary stabilizer shoe axis;
the secondary stabilizer shoe defines a bore therein cooperatively configured for insertion therein of the eccentric portion of the secondary stabilizer mounting shaft; and
the resistance element is a deformable element disposed between the bore in the secondary stabilizer shoe and the eccentric portion of the secondary stabilizer mounting shaft.

20. The apparatus of claim 17, wherein, the secondary stabilizer is also movable along the axis of the secondary stabilizer mounting shaft.

21. The apparatus of claim 20, wherein:
the circular saw blade is movable along the axis of motion between a maximum retracted position and a maximum extended position of the circular saw blade with respect to the workpiece axis; and
the secondary stabilizer contact elements are positioned between the cutting edge and the axis of the circular saw blade regardless of the position of the circular saw blade along the axis of motion.

* * * * *